(12) United States Patent
Mori

(10) Patent No.: US 9,241,085 B2
(45) Date of Patent: Jan. 19, 2016

(54) IMAGE FORMING APPARATUS HAVING IMPROVED BLANK PAPER IMAGE DETECTION

(71) Applicant: BROTHER KOGYO KABUSHIKI KAISHA, Nagoya-shi, Aichi-ken (JP)

(72) Inventor: Hiroko Mori, Handa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/472,739

(22) Filed: Aug. 29, 2014

(65) Prior Publication Data

US 2015/0062658 A1 Mar. 5, 2015

(30) Foreign Application Priority Data

Aug. 30, 2013 (JP) ................................. 2013-178913
Aug. 30, 2013 (JP) ................................. 2013-178914
Jun. 5, 2014 (JP) ................................. 2014-116630

(51) Int. Cl.
*H04N 1/40* (2006.01)
*H04N 1/00* (2006.01)
*H04N 1/23* (2006.01)

(52) U.S. Cl.
CPC ............. *H04N 1/00803* (2013.01); *H04N 1/23* (2013.01)

(58) Field of Classification Search
None
See application file for complete search history.

(56) References Cited

U.S. PATENT DOCUMENTS

| 2012/0081761 A1 | 4/2012 | Nakamura et al. | |
|---|---|---|---|
| 2012/0154853 A1* | 6/2012 | Otake | 358/1.15 |
| 2014/0036320 A1* | 2/2014 | Tanaka | 358/465 |
| 2015/0015917 A1* | 1/2015 | Hirohata et al. | 358/3.24 |

FOREIGN PATENT DOCUMENTS

| JP | 2006-279094 A | 10/2006 |
|---|---|---|
| JP | 2007-208618 A | 8/2007 |
| JP | 2008-219808 A | 9/2008 |
| JP | 2010-035074 A | 2/2010 |
| JP | 2012-080231 A | 4/2012 |

* cited by examiner

*Primary Examiner* — Barbara Reinier
*Assistant Examiner* — Christopher D Wait
(74) *Attorney, Agent, or Firm* — Merchant & Gould PC

(57) ABSTRACT

An image processing apparatus includes: an obtaining unit configured to obtain a multi-value image as an obtained image; and a control device configured to: convert the obtained image into a first binary image; determine whether the first binary image is a blank paper image, on the basis of the first binary image; and output a binary image, the binary image outputting including: outputting the first binary image in a case where it is determined that the first binary image is not the blank paper image; and not outputting the first binary image in a case where it is determined that the first binary image is the blank paper image.

18 Claims, 19 Drawing Sheets

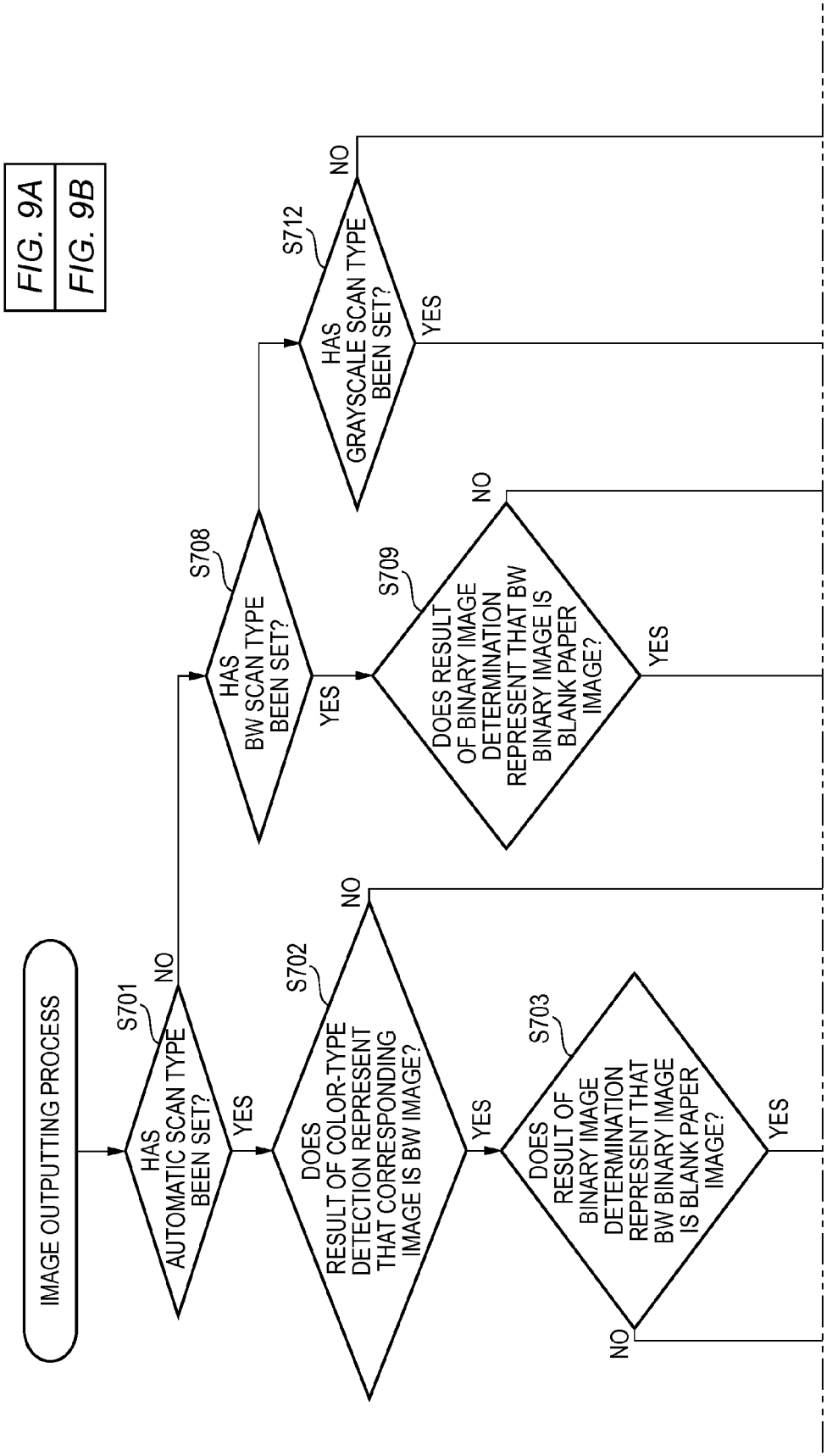

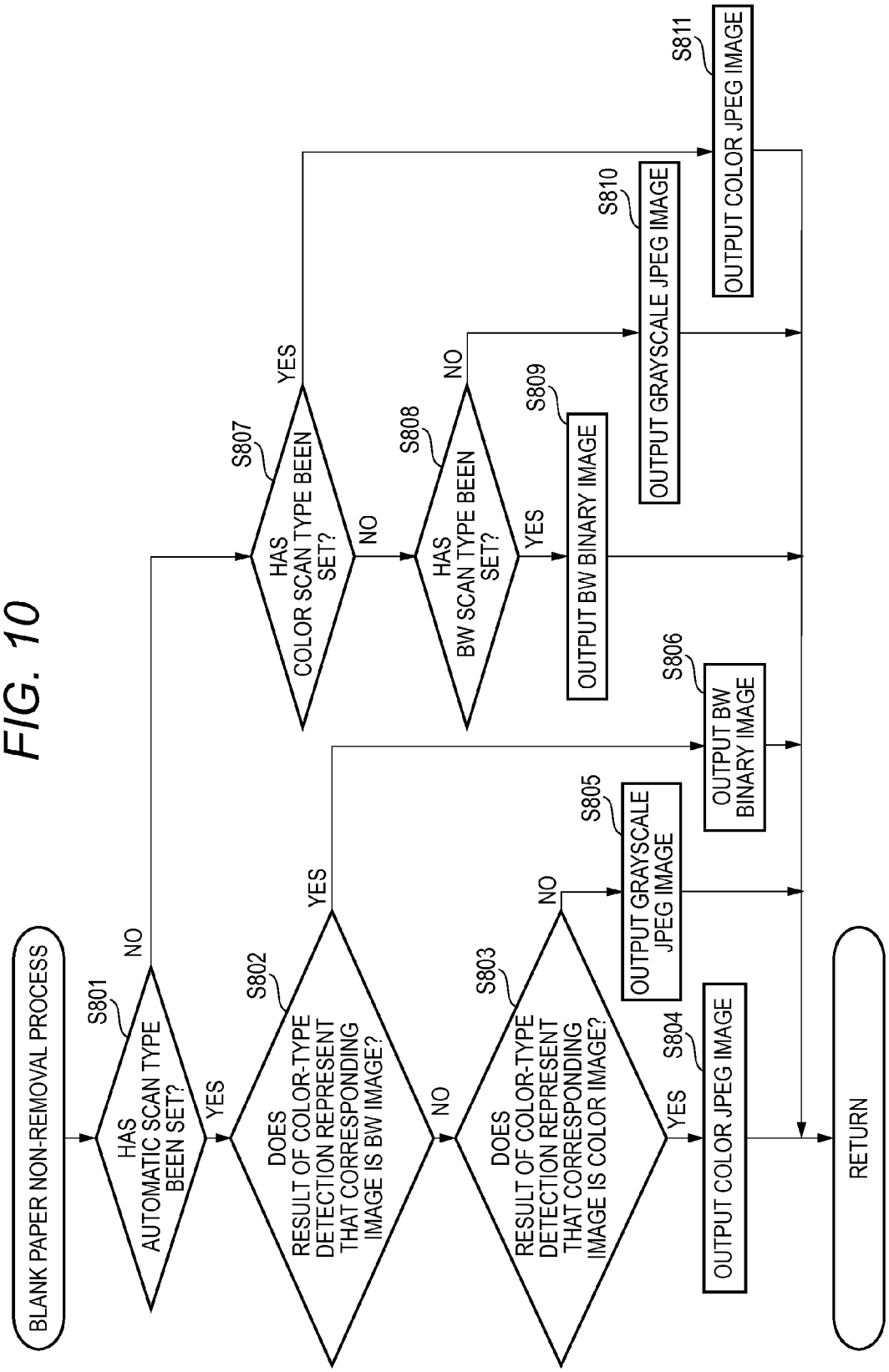

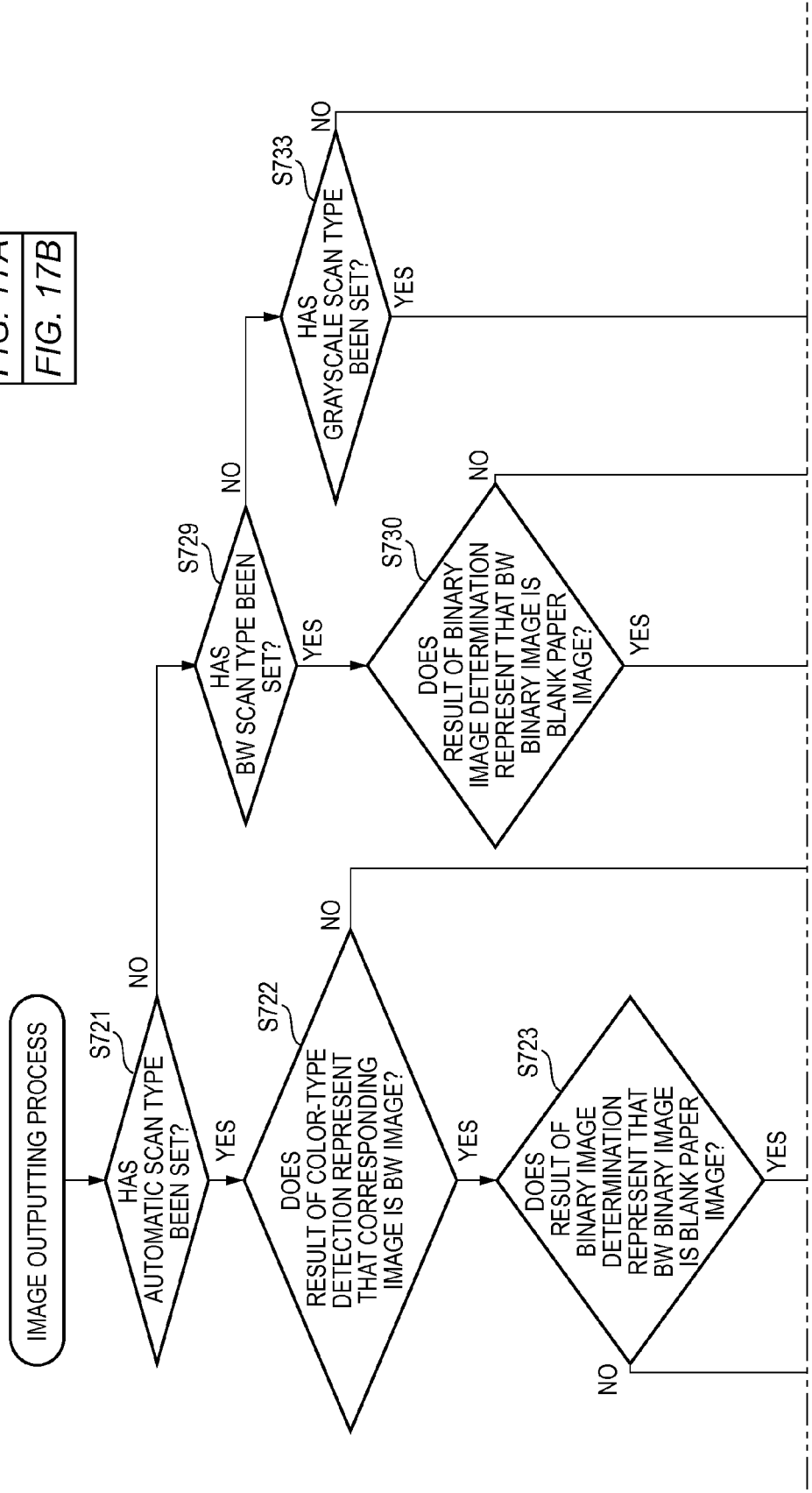

IMAGE FORMING APPARATUS HAVING IMPROVED BLANK PAPER IMAGE DETECTION

CROSS-REFERENCE TO RELATED APPLICATIONS

This application claims priority from Japanese Patent Application No. 2013-178913 filed on Aug. 30, 2013, Japanese Patent Application No. 2013-178914 filed on Aug. 30, 2013 and Japanese Patent Application No. 2014-116630 filed on Jun. 5, 2014, the entire subject-matters of which are incorporated herein by reference.

TECHNICAL FIELD

The disclosure relates to an image processing apparatus and an image processing program.

BACKGROUND

There has been known an image processing apparatus which performs a process of reading the images of documents and outputting the images onto paper sheets, a display, or the like.

Some of these kinds of image processing apparatuses have a blank paper determining function of determining whether a document is a blank document. If an image processing apparatus has a blank paper determining function, for example, it becomes possible to output the image of a document which is not a blank document and not to output the image of a blank document.

SUMMARY

Illustrative aspects of the present invention provide an image processing apparatus and an image processing program for obtaining an output result corresponding to a blank paper determination result.

According to one illustrative aspect of the present invention, there is provided an image processing apparatus comprising: an obtaining unit configured to obtain a multi-value image as an obtained image; and a control device executable with instructions which, when executed, cause the control device to: perform a binarizing process to convert the obtained image into a first binary image; perform a binary image determination process to determine whether the first binary image is a blank paper image, on the basis of the first binary image; and perform a first outputting process to output a binary image, the first outputting process comprising: outputting the first binary image only in a case where it is determined in the binary image determination process that the first binary image is not the blank paper image.

BRIEF DESCRIPTION OF THE DRAWINGS

FIGS. 9A and 9B are flow charts illustrating the flow of an image outputting process;

FIG. 10 is a flow chart illustrating the flow of a blank paper non-removal process;

FIGS. 17A and 17B are flow charts illustrating another example of the image outputting process;

DETAILED DESCRIPTION

<Illustrative Embodiments>

Hereinafter, illustrative embodiments of the present invention will be described in detail with reference to the accompanying drawings.

Figure 1:
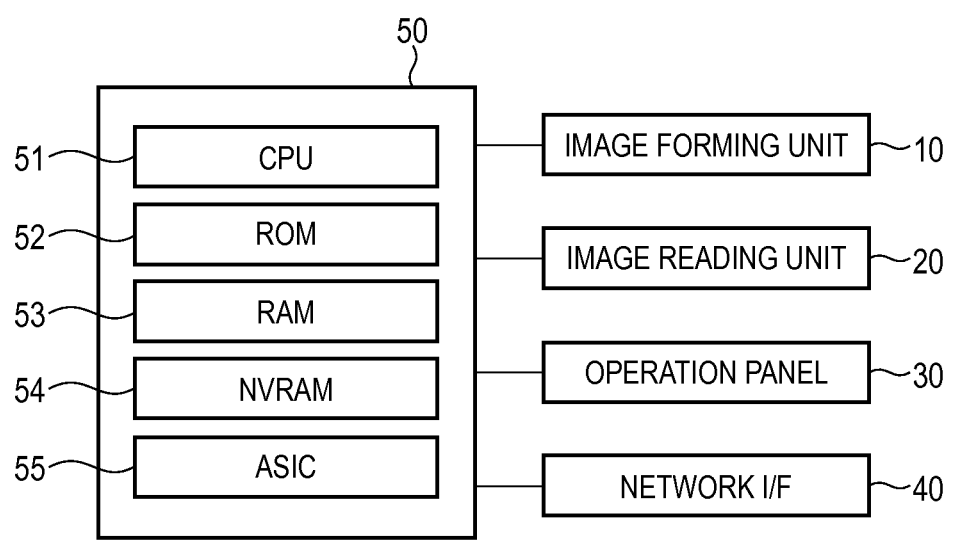
FIG. 1 is a block diagram illustrating the configuration of a multi-function peripheral (MFP) according to an illustrative embodiment of the present invention.

A multi-function peripheral (MFP) 1 is an example of an image processing apparatus, and includes an image forming unit 10, an image reading unit 20, an operation panel 30, a network interface (I/F) 40, and a control unit 50, as shown in FIG. 1.

The image forming unit 10 performs printing (color printing or monochrome printing) based on image data, thereby forming images onto printing paper sheets or the like. The image forming scheme may be an electrophotographic scheme, or may be an inkjet scheme.

The image reading unit 20 is an example of an obtaining unit, and reads the images of documents, thereby generating image data. The reading scheme may be an automatic document feeder (ADF) scheme for reading the images of documents while conveying the documents, or may be a flat bed (FB) scheme for reading the images of documents if each document is mounted on contact glass.

The operation panel 30 includes a touch panel. On the touch panel, a variety of information is displayed. Also, a user can touch the touch panel, thereby performing a variety of input. The operation panel 30 may include input keys such as numeric keys.

Since the MFP 1 includes the network I/F 40, the MFP 1 can perform communication with an external apparatus such as a personal computer (PC) connected to a local area network (LAN), through the LAN.

The control unit 50 includes a CPU 51, a ROM 52, a RAM 53, a non-volatile RAM (NVRAM) 54, and an ASIC 55. The CPU 51 executes programs for a variety of processes, thereby controlling the image forming unit 10, the image reading unit 20, and the operation panel 30, and controlling data communication through the network I/F 40. The ROM 52 retains programs which can be executed by the CPU 51, a variety of data, and so on. The RAM 53 is an example of a storage unit, and can be used as a work area when the CPU 51 executes a program. A variety of set values and the like can be input from the operation panel 30, and be stored in the NVRAM 54.

The MFP 1 has a reading function of reading the images of documents by the image reading unit 20, and outputting the read images (image data) onto printing paper sheets or the like, or outputting the read images (image data) to an external PC or the like through the network I/F 40.

In a case of using the reading function, the user can operate the operation panel 30, thereby setting a scan type. There are four scan types, that is, a black-and-white (BW) scan type, a grayscale scan type, a color scan type, and an automatic scan type. If the BW scan type is set, the image of each document is read as a black-and-white binary image (BW image) and the BW binary image is output. If the grayscale scan type is set, the image of each document is read as a grayscale JPEG image which is a black-and-white image represented with 256 intermediate tones, and the grayscale JPEG image is output. If the color scan type is set, the image of each document is read as a color JPEG image represented with 256 tones, and the color JPEG image is output. If the automatic scan type is set, it is automatically determined which of a BW image, a grayscale image, and a color image the image of each document is, and an image according to the result of the determination is output.

As described above, the number of tones of each grayscale JPEG image or each color JPEG image is, for example, 256; however, it may be smaller or larger than 256. Also, although the file format of grayscale JPEG images and color JPEG images is JPEG format, the file format of output images may be a format other than JPEG format, such as TIFF, XPS format, or PDF.

Also, the MFP 1 has a blank paper removal function. The blank paper removal function is a function of determining whether the image of a document having been read by the image reading unit 20 is a blank paper image, and preventing a blank paper image from being output if the image of the document is a blank paper image. The user can operate the operation panel 30, thereby setting whether to validate or invalidate the blank paper removal function.

Figure 2:
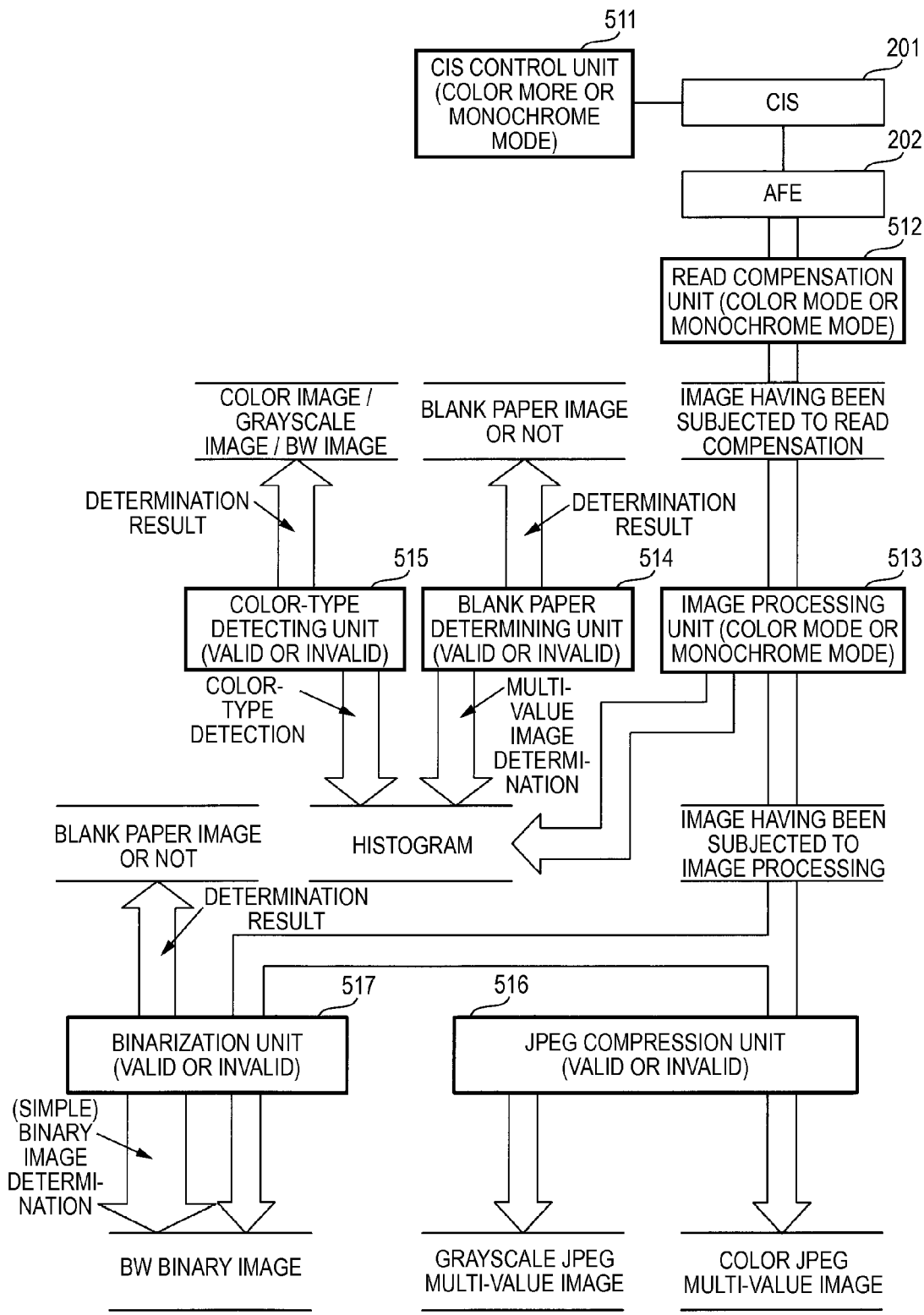
FIG. 2 is a block diagram illustrating the configuration of a control unit.

The CPU 51 of the control unit 50 executes programs, thereby implementing the functions of a CIS control unit 511, a read compensation unit 512, an image processing unit 513, a blank paper determining unit 514, a color-type detecting unit 515, a JPEG compression unit 516, and a binarization unit 517 shown in FIG. 2.

The CIS control unit 511 controls a contact image sensor (CIS) 201 and an analog front end (AFE) 202 included in the image reading unit 20. As control modes of the CIS control unit 511, there are a color mode appropriate for reading color images, and a monochrome mode appropriate for reading BW images and grayscale images. According to control of the CIS control unit 511 on the CIS 201 and the AFE 202, the CIS 201 outputs an analog image signal according to light reflected from a document, and the AFE 202 converts the analog image signal into digital image data of 8 bits (0 to 255).

The read compensation unit 512 performs read compensation (shading compensation) on an image (8-bit digital image data) having been output from the AFE 202, thereby eliminating density irregularity between pixels caused by irregularity in the intensity of light radiated onto a document (illumination irregularity) or any other factor. As compensation modes, there are a color mode for performing read compensation appropriate for color images, and a monochrome mode for performing read compensation appropriate for BW images and grayscale images. After performing the read compensation, the read compensation unit 512 saves the read compensated image in the RAM 53.

The image processing unit 513 performs a variety of image processing on the compensated image. As processing modes of the image processing unit 513, there are a color mode for performing image processing appropriate for color images, and a monochrome mode for performing image processing appropriate for BW images and grayscale images. Examples of the image processing include an edge enhancing process of enhancing the edge of an image, and a resolution changing process of changing the resolution of an image, and a color converting process of converting the color space of an image from RGB into YCbCr. The image processing unit 513 saves the image having been subjected to the image processing, in the RAM 53.

Also, the image processing unit 513 performs a color converting process on an image, and divides the converted image into a plurality of blocks in a lattice form. For example, every block is composed of 100-by-100 pixels. With respect to each block, the image processing unit 513 generates a Y component (luminance component) histogram, a Cb component (color difference data) histogram, and a Cr component (color difference data) histogram. Thereafter, the image processing unit 513 saves the Y component histograms, the Cb component histograms, and the Cr component histograms having been generated with respect to the individual blocks, in the RAM 53.

The blank paper determining unit 514 determines whether the image having been subjected to the color converting process by the image processing unit 513 is a blank paper image.

Specifically, the blank paper determining unit 514 obtains the Y component modes of the individual blocks, with reference to the Y component histograms of the individual blocks having been saved in the RAM 53. In case of almost solid white blocks, the Y component modes are concentrated in the vicinity of 255. Also, in a case where an entire image is almost solid white, if a histogram of the Y component modes of the individual blocks is generated, in the histogram, the modes are concentrated in the vicinity of 255. Then, the blank paper determining unit 514 obtains the number of blocks having the same Y component mode as the mode of the histogram of the Y component modes of the individual blocks. If the number of corresponding blocks is equal to or larger than a predetermined value, the blank paper determining unit 514 determines that the image having been subjected to the color converting process is a blank paper image. Thereafter, the blank paper determining unit 514 saves the result of the determination in the RAM 53. Hereinafter, the determination of the blank paper determining unit 514 will be referred to as multi-value image determination.

Also, in a case where the blank paper removal function has been set to be invalid, the blank paper determining unit 514 is set to be invalid, and thus the multi-value image determination is not performed.

The color-type detecting unit 515 detects the color type, thereby determining which of a BW image, a grayscale image, and a color image the image having been subjected to the color converting process by the image processing unit 513 is.

Specifically, with respect to each block having been saved in the RAM 53, the color-type detecting unit 515 determines whether the corresponding block is a chromatic color block or an achromatic color block. In a color space YCbCr, if each of the Cb component value range and the Cr component value range is 0 to 255, pixel colors having Cb component values and Cr component values close to the center value (which is 127) incline to achromatic colors. Therefore, for example, with respect to each block, if it is determined that both of the following expressions (1) and (2) are satisfied, with reference to the Cb component histogram and the Cr component histogram of the corresponding block, the color-type detecting unit 515 determines that the corresponding block is an achromatic color block. On the other hand, if at least one of the following expressions (1) and (2) is not satisfied, the color-type detecting unit 515 determines that the corresponding block is a chromatic color block.

$$112 \leq [\text{MEAN OF Cb COMPONENTS}] \leq 143 \quad (1)$$

$$112 \leq [\text{MEAN OF Cr COMPONENTS}] \leq 143 \quad (2)$$

Also, the numerical values in the expressions (1) and (2) are just illustrative, and may be appropriately changed. The same is applied to the following expression (3).

Thereafter, with respect to each achromatic color block, the color-type detecting unit 515 determines whether the corresponding block is a BW block or a grayscale block. In a color space YCbCr, if each of the Y component value range, the Cb component value range, and the Cr component value range is 0 to 255, when each of the Cb component value and the Cr component value is close to the center value (which is 127), as the Y component value approaches 0, the pixel color approaches black, and as the Y component value approaches 255, the pixel color approaches white. Therefore, with respect to each achromatic color block, for example, if the following expression (3) is satisfied with reference to the Y component histogram, the color-type detecting unit 515 determines that the corresponding achromatic color block is a BW block. On the other hand, if the following expression (3) is not satisfied, the corresponding achromatic color block is a grayscale block.

$$[\text{RATIO OF PIXELS HAVING Y COMPONENT VALUES SMALLER THAN 63 OR EQUAL TO OR LARGER THAN 224}] \geq 40\% \quad (3)$$

In a case where both of the mode of Cb components and the mode of Cr components in an image (the image of one page) having been subjected to the image processing are within a range equal to or larger than 112 and smaller than 143, or the ratio of color blocks in the image having been subjected to the image processing is a predetermined ratio (for example, 0.2%) or more, the color-type detecting unit 515 determines that the image having been subjected to the image processing is a color image. In a case where at least one of the mode of Cb components and the mode of Cr components in the image (the image of one page) having been subjected to the image processing is out of the range equal to or larger than 112 and smaller than 143, and the ratio of grayscale blocks in the image having been subjected to the image processing is a predetermined ratio (for example, 0.3%) or more, the color-type detecting unit 515 determines that the image having been subjected to the image processing is a grayscale image. Also, in a case where at least one of the mode of Cb components and the mode of Cr components in the image (the image of one page) having been subjected to the image processing is out of the range equal to or larger than 112 and smaller than 143, and the ratio of grayscale blocks in the image having been subjected to the image processing is smaller than the predetermined ratio, the color-type detecting unit 515 determines that the image having been subjected to the image processing is a BW image.

Also, if the automatic scan type is set, the color-type detecting unit 515 is set to be valid, and if any one of the BW scan type, the grayscale scan type, the color scan type is set, the color-type detecting unit 515 is set to be invalid. If the color-type detecting unit 515 is set to be valid, the color-type detecting unit 515 does not perform the above described determination.

The JPEG compression unit 516 compresses each image having been subjected to the image processing and having been saved in the RAM 53, thereby generating a grayscale JPEG multi-value image or a color JPEG multi-value image.

Specifically, as operation modes of the JPEG compression unit 516, there are a mode for generating only grayscale JPEG multi-value images, and a mode for generating only color JPEG multi-value images. Any one of the operation modes is selectively set so as to be valid, or all of the operation modes are set so as to be invalid. In a case where the BW scan type has been set, all operation modes of the JPEG compression unit 516 are set to be invalid, and thus the JPEG compression unit 516 does not generate any of a grayscale JPEG multi-value image and a color JPEG multi-value image. In a case where the grayscale scan type has been set, the mode for generating only grayscale JPEG multi-value images (a grayscale mode) is set to be valid, and thus the JPEG compression unit 516 generates only a grayscale JPEG multi-value image. In a case where the color scan type has been set, the mode for generating only color JPEG multi-value images (a color mode) is set to be valid, and thus the JPEG compression unit 516 generates only a color JPEG multi-value image. Also, in a case where the automatic scan type has been set, any one of the modes for generating grayscale JPEG multi-value images or color JPEG multi-value images (the grayscale mode or the color mode) is set to be valid, and the JPEG compression unit 516 generates either a grayscale JPEG multi-value image or a color JPEG multi-value image on the basis of the result of the determination of the color-type detecting unit 515. Thereafter, the JPEG compression unit 516 saves the grayscale JPEG multi-value image or the color JPEG multi-value image having been generated, in the RAM 53.

In a case where the BW scan type or the automatic scan type has been set, the binarization unit 517 is set to be valid, and performs binarization on the image having been subjected to the image processing and having been saved in the RAM 53, thereby generating a BW binary image. Also, in a case where the binarization unit 517 is set to be valid, as a binarization mode, any one of a simple binarization mode and an error diffusion mode is selectively set. Normally, the simple binarization mode is set. In this case, with respect to each pixel of the image having been subjected to the image processing, if the Y component value is equal to or larger than a predetermined threshold value, the binarization unit 517 converts the corresponding pixel into a white pixel, and if the Y component value is smaller than the predetermined threshold value, the binarization unit 517 converts the corresponding pixel into a black pixel. The binarization unit 517 saves the generated BW binary image in the RAM 53. In a case where the grayscale scan type or the color scan type has been set, the binarization unit 517 is set to be invalid, and thus the binarization unit 517 does not generate any BW binary image.

Also, the binarization unit 517 performs a binary image determination process (to be described below), thereby determining whether the BW binary image is a blank paper image. This determination of the binarization unit 517 will be hereinafter referred to as binary image determination.

Hereinafter, a first example of a reading process will be described.

Figure 3:
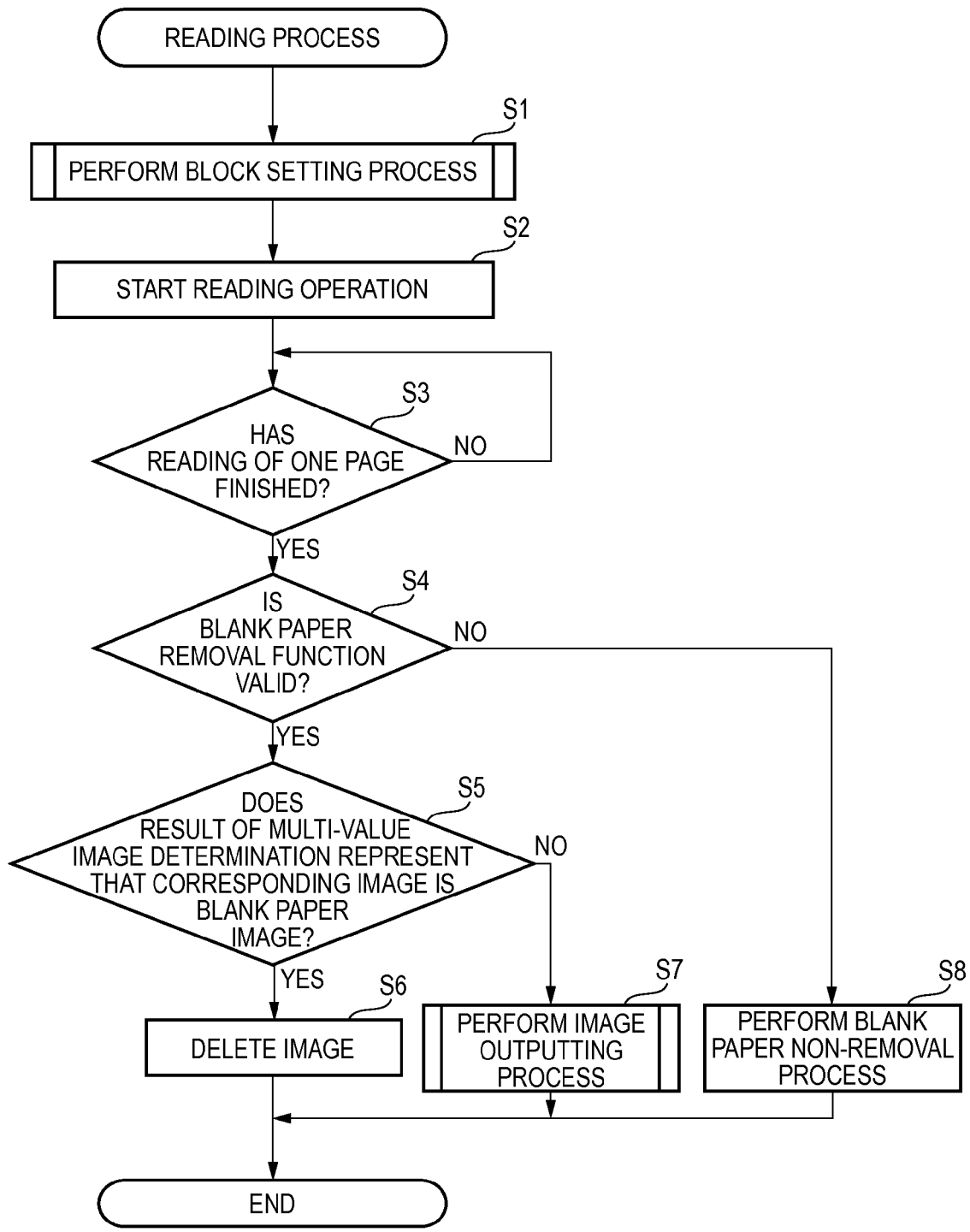
FIG. 3 is a flow chart illustrating the flow of a reading process.

If the user operates the operation panel 30, thereby inputting an instruction for reading the images of documents, the CPU 51 of the control unit 50 performs a reading process shown in FIG. 3, with respect to every page of the documents.

In the reading process, in STEP S1, the CPU 51 performs a block setting process. The block setting process will be described below.

After the block setting process finishes, in STEP S2, the CPU 51 starts a document reading operation of the image reading unit 20. With the start of the reading operation, a process of the CIS control unit 511 shown in FIG. 2 is started.

Thereafter, in STEP S3, the CPU 51 determines whether reading of one page of documents has finished. In a case of reading the images of the documents by the ADF scheme, for example, if a document of one page (one sheet) passes over the CIS 201 of the image reading unit 20, it is possible to determine that reading of one page of the documents has finished. In a case of reading the images of the documents by the FB scheme, for example, if the CIS 201 reciprocates in a sub scan direction one time, it is possible to determine that reading of one page of the documents has finished.

If it is determined that reading of one page of the documents has not finished ("NO" in STEP S3), the CPU 51 returns to STEP S3. On the other hand, if it is determined that reading of one page of the documents has finished ("YES" in STEP S3), the processes of the read compensation unit 512 and the image processing unit 513 are started. In STEP S4, the CPU 51 determines whether the blank paper removal function is valid.

In a case where the blank paper removal function has been set to be valid ("YES" in STEP S4), the multi-value image determination of the blank paper determining unit 514 is performed. Thereafter, in STEP S5, the CPU 51 determines whether the result of the multi-value image determination of the blank paper determining unit 514 represents that the corresponding image is a blank paper image.

In a case where the result of the multi-value image determination represents that the corresponding image is a blank paper image ("YES" in STEP S5), if there is a corresponding grayscale JPEG multi-value image or a corresponding color JPEG multi-value image having been saved in the RAM 53, the CPU 51 deletes the corresponding grayscale JPEG multi-value image or the corresponding color JPEG multi-value image from the RAM 53, and finishes the reading process. If there is a corresponding BW binary image having been saved in the RAM 53, the CPU 51 deletes the corresponding BW binary image from the CPU 51 in STEP S6, and finishes the reading process.

Incidentally, when the automatic scan type has been set, if the process of the image processing unit 513 finishes, the color-type detection of the color-type detecting unit 515 is performed. Thereafter, according to the result of the color-type detection, a color JPEG multi-value image is generated by the JPEG compression unit 516, a grayscale JPEG multi-value image is generated by the JPEG compression unit 516, or a BW binary image is generated by the binarization unit 517 in addition to the grayscale JPEG multi-value image generated by the JPEG compression unit 516. Then, the generated image(s) is saved in the RAM 53. When the color scan type has been set, after the process of the image processing unit 513, a color JPEG multi-value image is generated by the JPEG compression unit 516 and is saved in RAM 53. When the grayscale scan type has been set, after the process of the image processing unit 513, a grayscale JPEG multi-value image is generated by the JPEG compression unit 516 and is saved in RAM 53. When the BW scan type has been set, after the process of the image processing unit 513, a BW binary image and a grayscale JPEG multi-value image are generated by the binarization unit 517 and the JPEG compression unit 516, respectively, and are saved in the RAM 53. Incidentally, when the BW scan type has been set, after the process of the image processing unit 513, only the BW binary image may be generated by the binarization unit 517. In such a case, the grayscale JPEG multi-value image may be generated by the JPEG compression unit 516 when necessary.

In a case where the result of the multi-value image determination represents that the corresponding image is not a blank paper image ("NO" in STEP S5), the CPU 51 performs an image outputting process in STEP S7, and finishes the reading process. The image outputting process will be described below.

On the other hand, in a case where the blank paper removal function has been set to be invalid ("NO" in STEP S4), the CPU 51 performs a blank paper non-removal process in STEP S8, and finishes the reading process.

Figure 4:
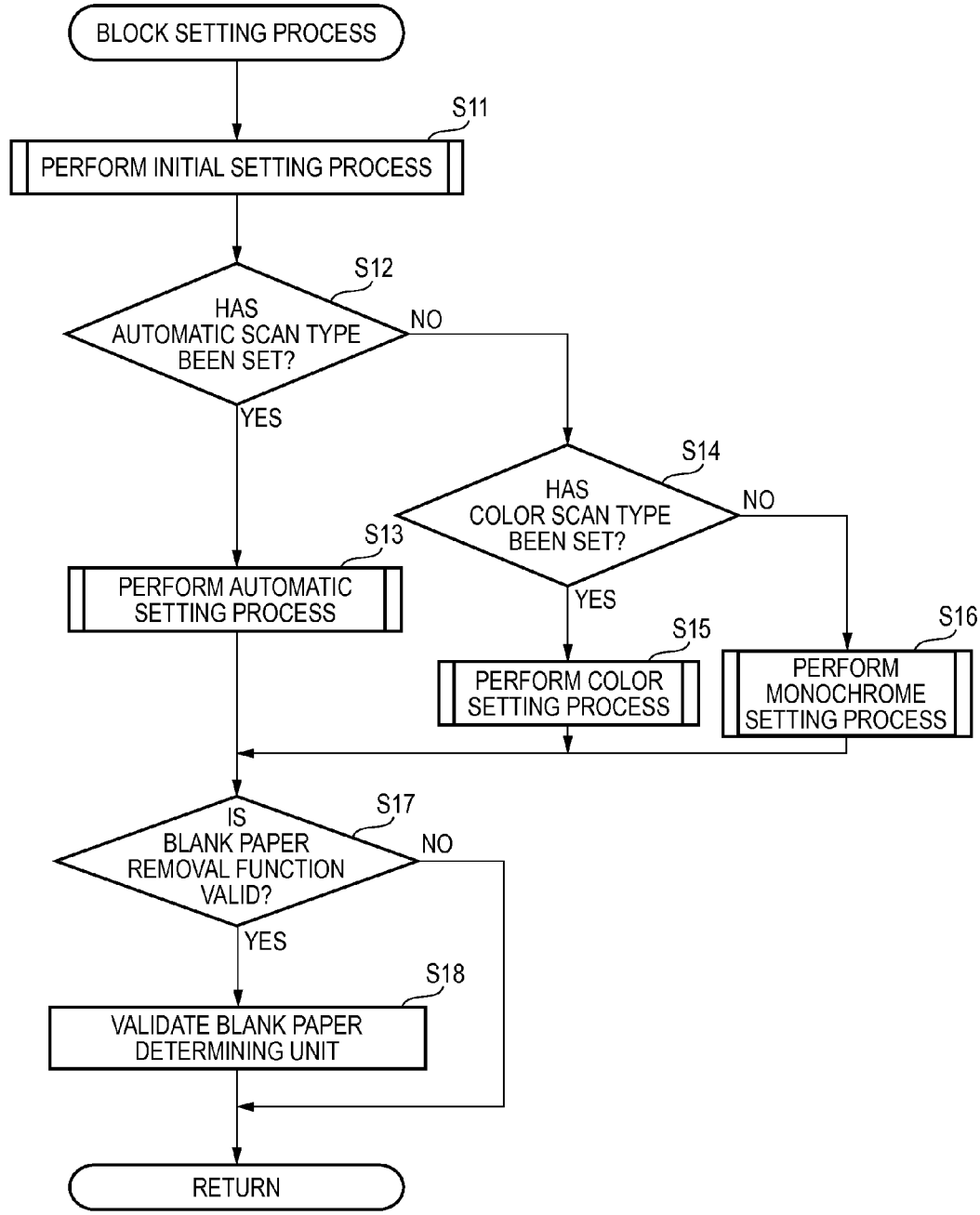
FIG. 4 is a flow chart illustrating the content of a block setting process.

In FIG. 4, there is shown the flow of the block setting process which is performed in STEP S1 shown in FIG. 3.

In the block setting process, in STEP S11, the CPU 51 performs an initial setting process. The initial setting process will be described below.

After the initial setting process finishes, in STEP S12, the CPU 51 determines whether the automatic scan type has been set.

In a case where the automatic scan type has been set ("YES" in STEP S12), in STEP S13, the CPU 51 performs an automatic setting process. The automatic setting process will be described below.

In a case where the automatic scan type has not been set ("NO" in STEP S12), in STEP S14, the CPU 51 determines whether the color scan type has been set.

In a case where the color scan type has been set ("YES" in STEP S14), in STEP S15, the CPU 51 performs a color setting process. The color setting process will be described below.

In a case where any of the automatic scan type and the color scan type has not been set ("NO" in STEP S14), in STEP S16, the CPU 51 performs a monochrome setting process. The monochrome setting process will be described below.

After any one of the automatic setting process, the color setting process, and the monochrome setting process finishes, in STEP S17, the CPU 51 determines whether the blank paper removal function is valid.

In a case where the blank paper removal function has been set to be valid ("YES" in STEP S17), the CPU 51 validates the blank paper determining unit 514 in STEP S18, and finishes the block setting process.

In a case where the blank paper removal function has been set to be invalid ("NO" in STEP S17), the CPU 51 skips the process of STEP S18, thereby finishing the block setting process without validating the blank paper determining unit 514.

Figure 5:
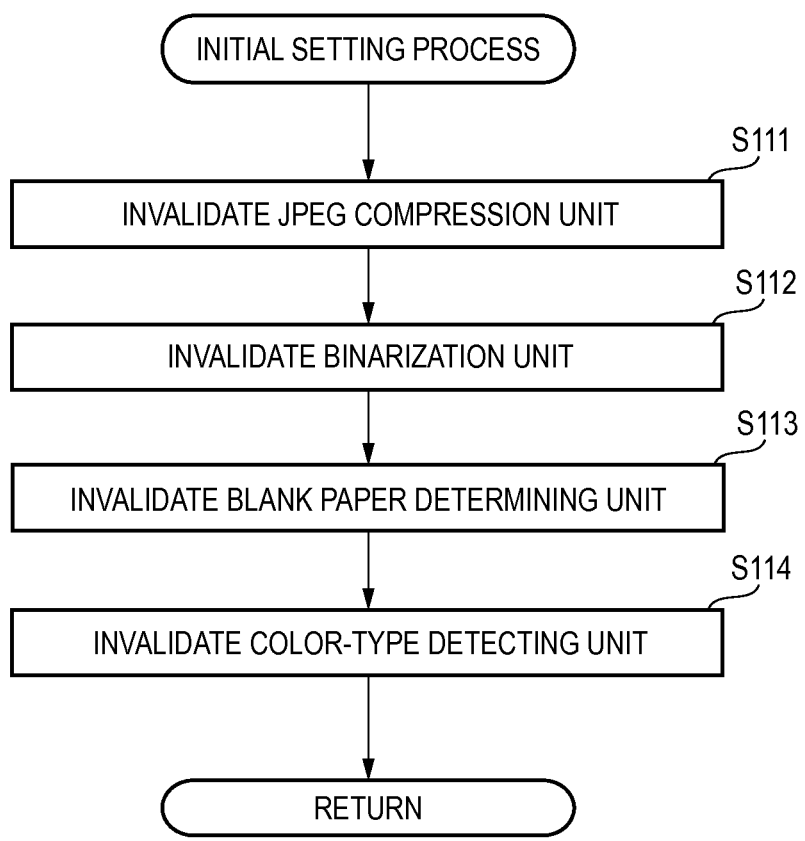
FIG. 5 is a flow chart illustrating the content of an initial setting process.

In FIG. 5, there is shown the content of the initial setting process which is performed in STEP S11 shown in FIG. 4.

In the initial setting process, the CPU 51 invalidates all of the JPEG compression unit 516, the binarization unit 517, the blank paper determining unit 514, and the color-type detecting unit 515 in STEPS S111, S112, S113, and S114, and finishes the initial setting process.

Figure 6:
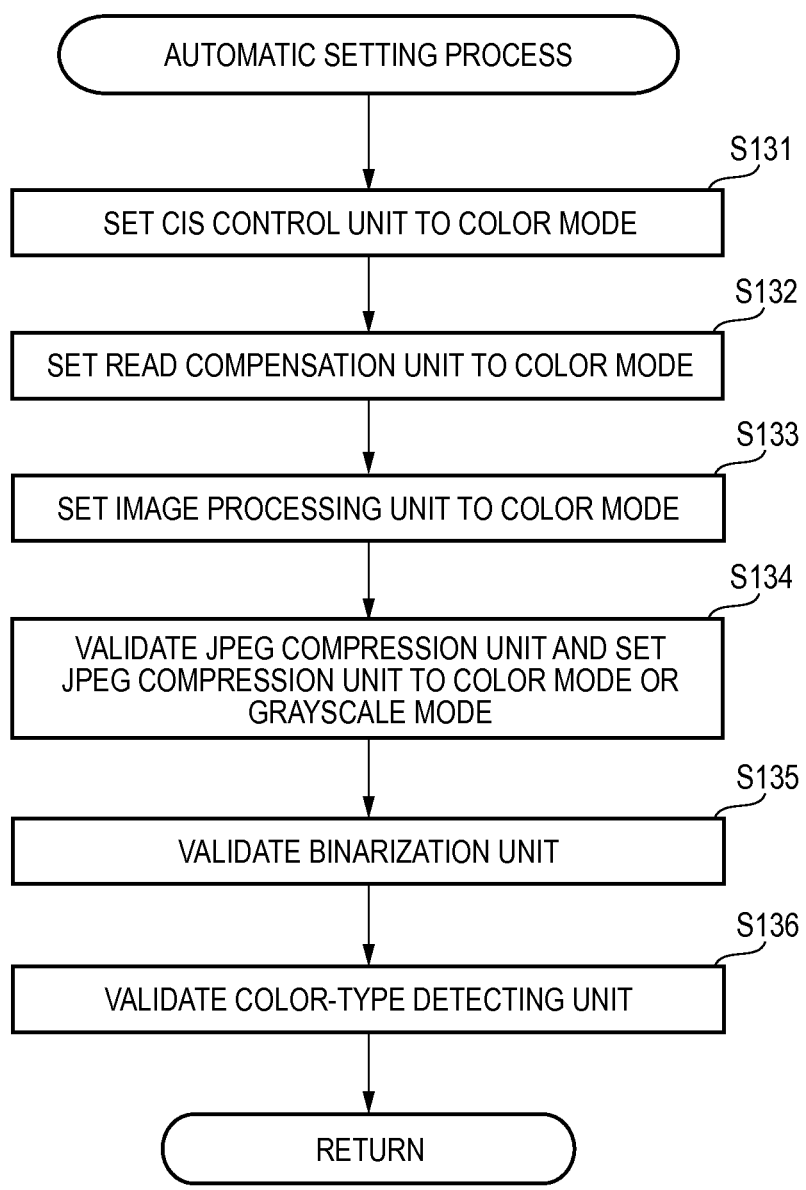
FIG. 6 is a flow chart illustrating the content of an automatic setting process.

In FIG. 6, there is shown the content of the automatic setting process which is performed in STEP S13 shown in FIG. 4.

In the automatic setting process, the CPU 51 performs a variety of following setting.

In STEP S131, the CPU 51 sets the control mode of the CIS control unit 511 to the color mode appropriate for reading color images.

In STEP S132, the CPU 51 sets the compensation mode of the read compensation unit 512 to the color mode for performing read compensation appropriate for color images.

In STEP S133, the CPU 51 sets the processing mode of the image processing unit 513 to the color mode for performing image processing appropriate for color images.

In STEP S134, the CPU 51 validates any one of the modes for generating grayscale JPEG multi-value images or color JPEG multi-value images (the grayscale mode or the color mode), as the operation mode of the JPEG compression unit 516.

In STEP S135, the CPU 51 validates the binarization unit 517, and sets the binarization unit 517 to the simple binarization mode.

In STEP S136, the CPU 51 validates the color-type detecting unit 515.

Figure 7:
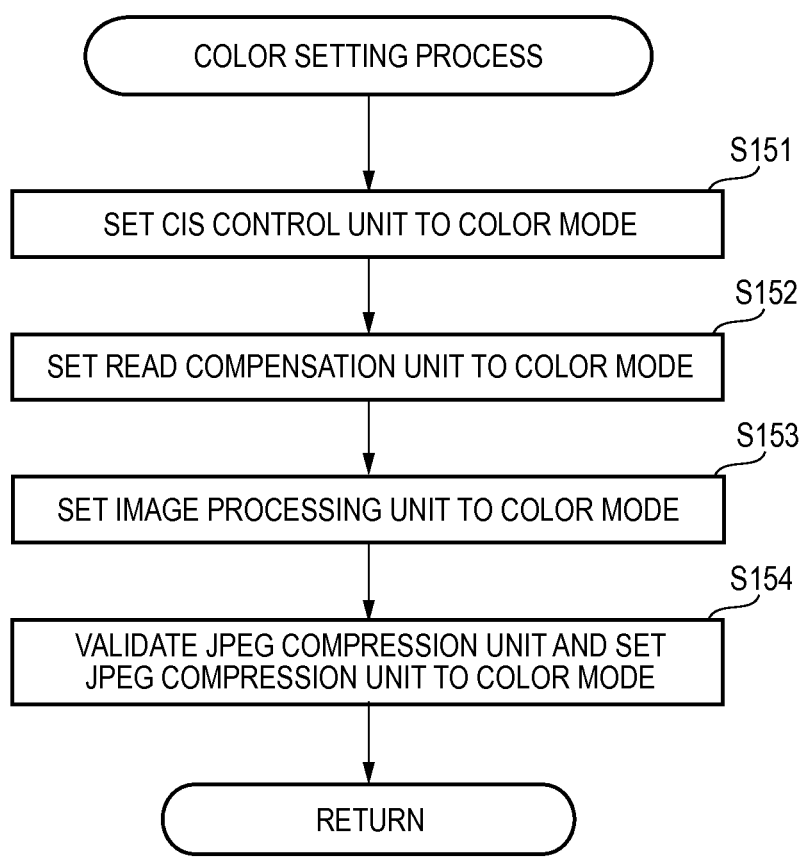
FIG. 7 is a flow chart illustrating the content of a color mode setting process.

In FIG. 7, there is shown the content of the color setting process which is performed in STEP S15 shown in FIG. 4.

In the color setting process, the CPU 51 performs a variety of following setting.

In STEP S151, the CPU 51 sets the control mode of the CIS control unit 511 to the color mode appropriate for reading color images.

In STEP S152, the CPU 51 sets the compensation mode of the read compensation unit 512 to the color mode for performing read compensation appropriate for color images.

In STEP S153, the CPU 51 sets the processing mode of the image processing unit 513 to the color mode for performing image processing appropriate for color images.

In STEP S154, the CPU 51 validates the mode for generating only color JPEG multi-value images (the color mode), as the operation mode of the JPEG compression unit 516.

Figure 8:
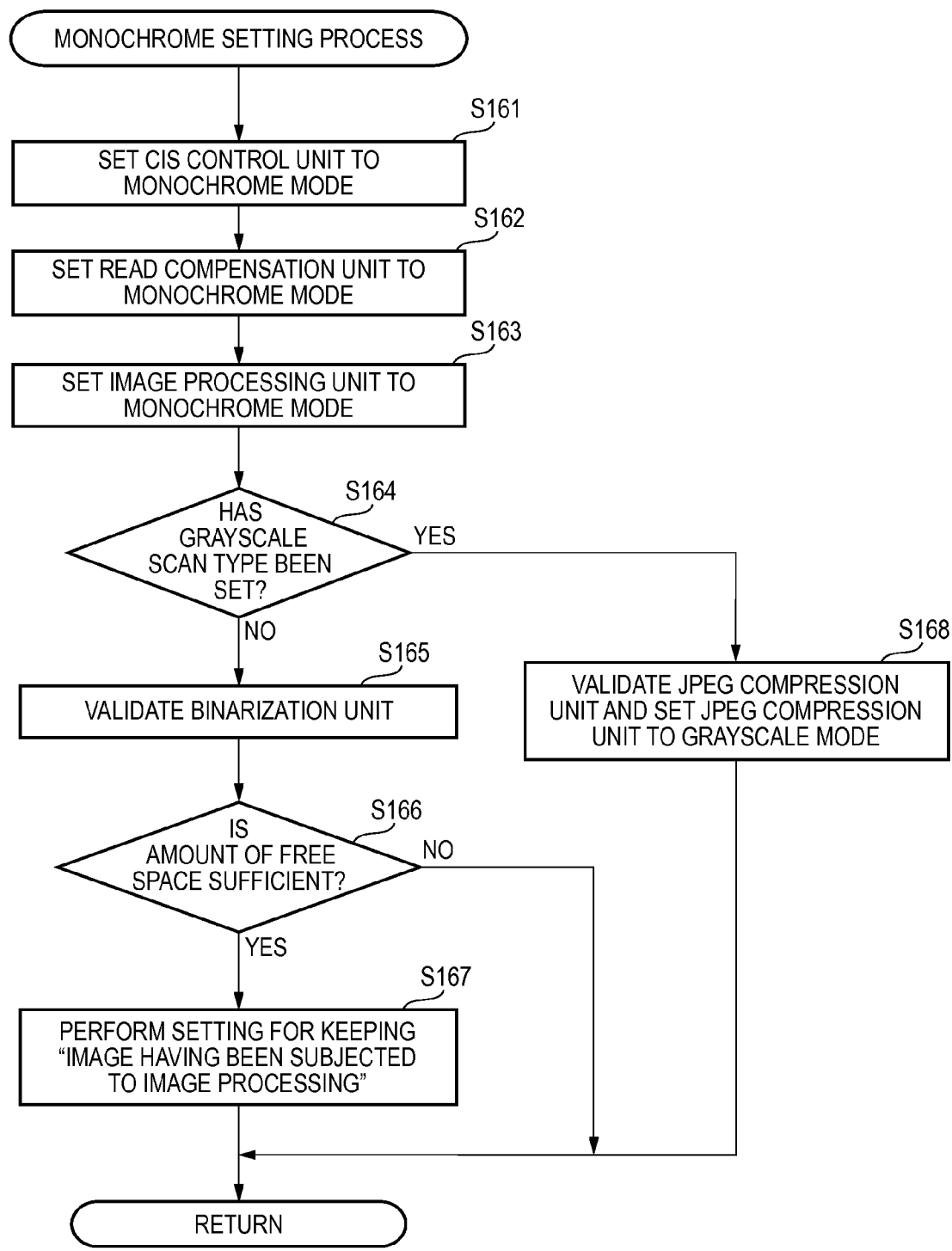
FIG. 8 is a flow chart illustrating the content of a monochrome mode setting process.

In FIG. 8, there is shown the content of the monochrome setting process which is performed in STEP S16 shown in FIG. 4.

In the monochrome setting process, in STEP S161, the CPU 51 sets the control mode of the CIS control unit 511 to the monochrome mode appropriate for reading BW images and grayscale images.

Next, in STEP S162, the CPU 51 sets the compensation mode of the read compensation unit 512 to the monochrome mode for performing read compensation appropriate for BW images and grayscale images.

Subsequently, in STEP S163, the CPU 51 sets the processing mode of the image processing unit 513 to the monochrome mode for performing image processing appropriate for BW images and grayscale images.

Thereafter, in STEP S164, the CPU 51 determines whether the grayscale scan type has been set.

In a case where the grayscale scan type has not been set ("NO" in STEP S164), in STEP S165, the CPU 51 validates the binarization unit 517, and sets the binarization unit 517 to the simple binarization mode.

Thereafter, in STEP S166, the CPU 51 determines whether there is a sufficient amount of free space in the RAM 53, specifically, whether the amount of free space of the RAM 53 is equal to or larger than a defined amount (for example, 30 MB).

In a case where the amount of free space is equal to or larger than the defined amount, the CPU 51 determines that there is a sufficient amount of free space in the RAM 53 ("YES" in STEP S166). In this case, in STEP S167, the CPU 51 performs setting for keeping an image having been subjected to image processing and having been saved in the RAM 53, without deleting the corresponding image even after a corresponding image is generated by the binarization unit 517. Then, the CPU 51 finishes the monochrome setting process.

In a case where the amount of free space is smaller than the defined amount, the CPU 51 determines that the amount of free space of the RAM 53 is not sufficient ("NO" in STEP S166), and skips the process of STEP S167, and finishes the monochrome setting process. In this case, after an image is generated by the binarization unit 517, a corresponding image having been subjected to the image processing and having been saved in the RAM 53 is deleted.

In a case where the grayscale scan type has been set ("YES" in STEP S164), the CPU 51 validates the mode for generating only grayscale JPEG multi-value images (the grayscale mode), as the operation mode of the JPEG compression unit 516, in STEP S168, and then finishes the monochrome setting process.

Hereinafter, a first example of an image outputting process will be described.

Figure 9B:
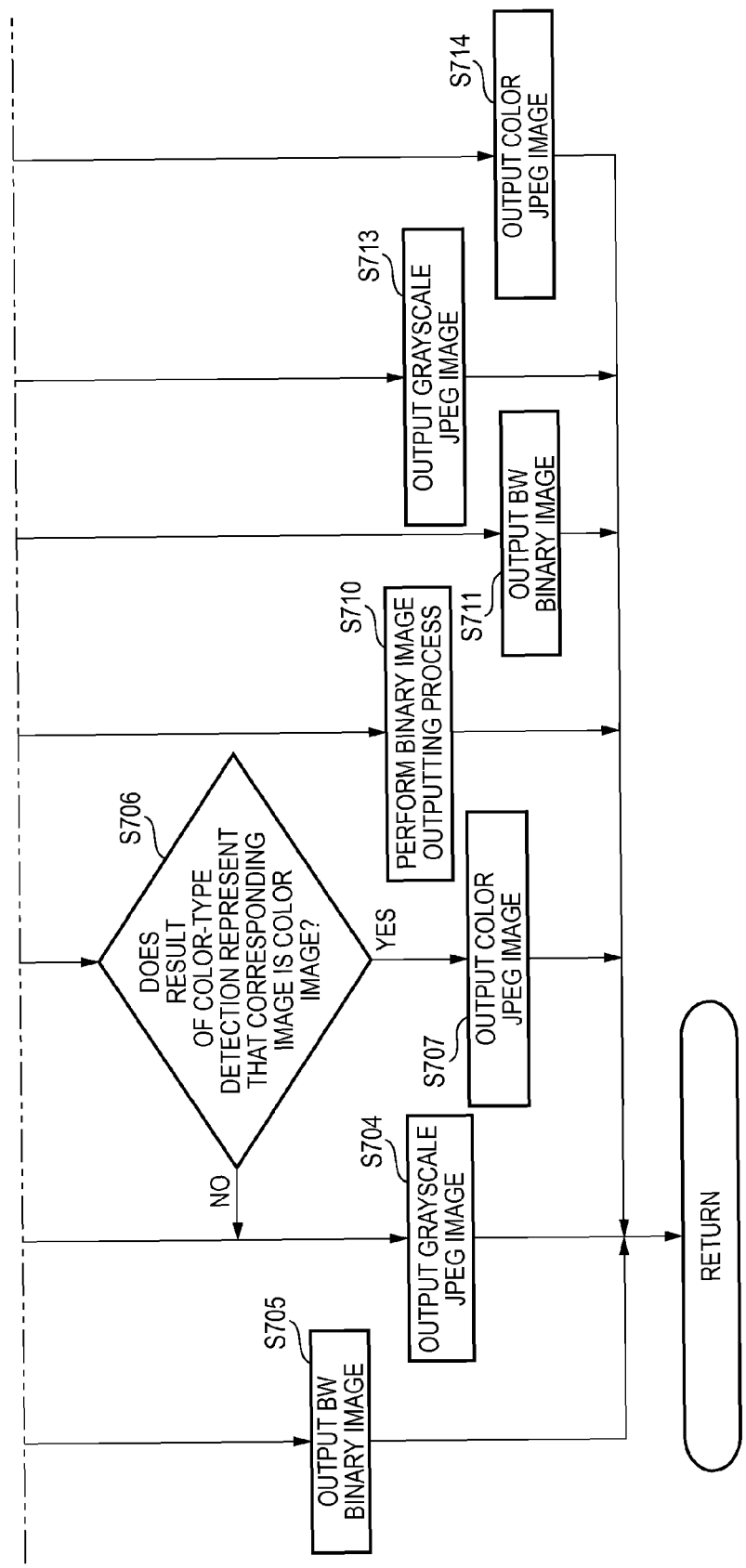

In FIG. 9, there is shown the flow of the image outputting process which is performed in STEP S7 shown in FIG. 3.

In the image outputting process, in STEP S701, the CPU 51 determines whether the automatic scan type has been set.

In a case where the automatic scan type has been set, in the automatic setting process described above, as the operation mode of the JPEG compression unit 516, the mode for generating grayscale JPEG multi-value images or color JPEG multi-value images (the grayscale mode or the color mode) is validated, and the binarization unit 517 is validated.

In the case where the automatic scan type has been set ("YES" in STEP S701), in STEP S702, the CPU 51 determines whether the result of the determination of the color-type detecting unit 515 represents that the corresponding image is a BW image.

In a case where the result of the determination of the color-type detecting unit 515 represents that the corresponding image is a BW image ("YES" in STEP S702), the CPU 51 performs control such that the binarization unit 517 generates a BW binary image, and performs binary image determination on the BW binary image. Also, the CPU 51 performs control such that the JPEG compression unit 516 generates a grayscale JPEG multi-value image as described above. Thereafter, in STEP S703, the CPU 51 determines whether the result of the binary image determination of the binarization unit 517 represents that the BW binary image is a blank paper image.

In a case where the result of the binary image determination of the binarization unit 517 represents that the BW binary image is a blank paper image ("YES" in STEP S703), in STEP S704, the CPU 51 performs control such that the JPEG compression unit 516 outputs the generated grayscale JPEG multi-value image to a predetermined output destination (such as the image forming unit 10 or a PC connected to a LAN). In this way, even in a case where the result of the multi-value image determination represents that the corresponding image is not a blank paper image, if the result of the binary image determination represents that the BW binary image is a blank paper image, it is possible to output the grayscale JPEG multi-value image, not a blank paper image.

After the grayscale JPEG multi-value image is output, the CPU 51 finishes the image outputting process.

On the other hand, in a case where the result of the binary image determination represents that the BW binary image is not a blank paper image ("NO" in STEP S703), the CPU 51 outputs the BW binary image having been generated by the function of the binarization unit 517, to the predetermined output destination, in STEP S705, and then finishes the image outputting process.

On the other hand, in a case where the result of the determination of the color-type detecting unit 515 represents that the corresponding image is not a BW image ("NO" in STEP S702), in STEP S706, the CPU 51 determines whether the result of the determination of the color-type detecting unit 515 represents that the corresponding image is a color image.

In a case where the result of the determination of the color-type detecting unit 515 represents that the corresponding image is a color image ("YES" in STEP S706), in STEP S707, the CPU 51 performs control such that the JPEG compression unit 516 generates a color JPEG multi-value image, and outputs the color JPEG multi-value image to the predetermined output destination. Then, the CPU 51 finishes the image outputting process.

On the other hand, in a case where the result of the determination of the color-type detecting unit 515 represents that the corresponding image is not a BW image or a color image ("NO" in STEP S706), in STEP S704, the CPU 51 performs control such that the JPEG compression unit 516 generates a grayscale JPEG multi-value image, and outputs the grayscale JPEG multi-value image to the predetermined output destination. Then, the CPU 51 finishes the image outputting process.

In a case where the automatic scan type has not been set ("NO" in STEP S701), in STEP S708, the CPU 51 determines whether the BW scan type has been set.

In a case where the BW scan type has been set, in the monochrome setting process described above, the binarization unit 517 is validated.

In the case where the BW scan type has been set ("YES" in STEP S708), the CPU 51 performs control such that the binarization unit 517 performs binarization and the binary image determination. Thereafter, in STEP S709, the CPU 51 determines whether the result of the binary image determination of the binarization unit 517 represents that the BW binary image is a blank paper image.

In a case where the result of the binary image determination represents that the BW binary image is a blank paper image ("YES" in STEP S709), the CPU 51 performs a binary image outputting process in STEP S710, and then finishes the image outputting process.

In a case where the result of the binary image determination represents that the BW binary image is not a blank paper image ("NO" in STEP S709), the CPU 51 outputs the BW binary image having been generated by the function of the binarization unit 517, to the predetermined output destination, in STEP S711, and then finishes the image outputting process.

In a case where the BW scan type has not been set ("NO" in STEP S708), in STEP S712, the CPU 51 determines whether the grayscale scan type has been set.

In a case where the grayscale scan type has been set, in the monochrome setting process described above, as the operation mode of the JPEG compression unit 516, the mode for generating only grayscale JPEG multi-value images (the grayscale mode) is validated.

In the case where the grayscale scan type has been set ("YES" in STEP S712), the CPU 51 outputs the grayscale JPEG multi-value image having been generated by the function of the JPEG compression unit 516, to the predetermined output destination, in STEP S713, and then finishes the image outputting process.

In a case where any of the automatic scan type, the BW scan type, and the grayscale scan type has not been set, that is, in a case where the color scan type has been set ("NO" in STEP S712), in the color setting process described above, as the operation mode of the JPEG compression unit 516, the mode for generating only color JPEG multi-value images (the color mode) is validated. In this case, the CPU 51 outputs a color JPEG multi-value image having been generated by the function of the JPEG compression unit 516, to the predetermined output destination, in STEP S714, and then finishes the image outputting process.

In FIG. 10, there is shown the flow of the blank paper non-removal process which is performed in STEP S8 shown in FIG. 3.

In the blank paper non-removal process, in STEP S801, the CPU 51 determines whether the automatic scan type has been set.

In a case where the automatic scan type has been set, in the automatic setting process described above, as the operation mode of the JPEG compression unit 516, any one of the modes for generating grayscale JPEG multi-value images or color JPEG multi-value images (the grayscale mode or the color mode) is validated, and the binarization unit 517 is validated.

In the case where the automatic scan type has been set ("YES" in STEP S801), in STEP S802, the CPU 51 determines whether the result of the determination of the color-type detecting unit 515 represents that the corresponding image is a BW image.

In a case where the result of the determination of the color-type detecting unit 515 represents that the corresponding image is not a BW image ("NO" in STEP S802), in STEP S803, the CPU 51 determines whether the result of the determination of the color-type detecting unit 515 represents that the corresponding image is a color image.

In a case where the result of the determination of the color-type detecting unit 515 represents that the corresponding image is a color image ("YES" in STEP S803), in STEP S804, the CPU 51 performs control such that the JPEG compression unit 516 generates a color JPEG multi-value image, and outputs the color JPEG multi-value image to the predetermined output destination. Then, the CPU 51 finishes the blank paper non-removal process.

On the other hand, in a case where the result of the determination of the color-type detecting unit 515 represents that the corresponding image is not a BW image or a color image ("NO" in STEP S803), in STEP S805, the CPU 51 performs control such that the JPEG compression unit 516 generates a grayscale JPEG multi-value image, and outputs the grayscale JPEG multi-value image to the predetermined output destination. Then, the CPU 51 finishes the blank paper non-removal process.

In a case where the result of the determination of the color-type detecting unit 515 represents that the corresponding image is a BW image ("YES" in STEP S802), the CPU 51 outputs the BW binary image having been generated by the function of the binarization unit 517, to the predetermined output destination, in STEP S806, and then finishes the blank paper non-removal process.

On the other hand, in a case where the automatic scan type has not been set ("NO" in STEP S801), in STEP S807, the CPU 51 determines whether the color scan type has been set.

In a case where the color scan type has not been set ("NO" in STEP S807), in STEP S808, the CPU 51 determines whether the BW scan type has been set.

In a case where the BW scan type has been set, in the monochrome setting process described above, the binarization unit 517 is validated.

In the case where the BW scan type has been set ("YES" in STEP S808), the CPU 51 outputs the BW binary image having been generated by the function of the binarization unit 517, to the predetermined output destination, in STEP S809, and then finishes the blank paper non-removal process.

In a case where any of the automatic scan type, the color scan type, and the BW scan type has not been set, that is, in a case where the grayscale scan type has been set ("NO" in STEP S808), in the monochrome setting process described above, as the operation mode of the JPEG compression unit 516, the mode for generating only grayscale JPEG multi-value images (the grayscale mode) is validated. In this case, the CPU 51 outputs the grayscale JPEG multi-value image having been generated by the function of the JPEG compression unit 516, to the predetermined output destination, in STEP S810, and then finishes the blank paper non-removal process.

In a case where the color scan type has been set, in the color setting process described above, as the operation mode of the JPEG compression unit 516, the mode for generating only color JPEG multi-value images (the color mode) is validated. In this case, the CPU 51 outputs the color JPEG multi-value image having been generated by the function of the JPEG compression unit 516, to the predetermined output destination, in STEP S811, and then finishes the blank paper non-removal process.

Figure 11:
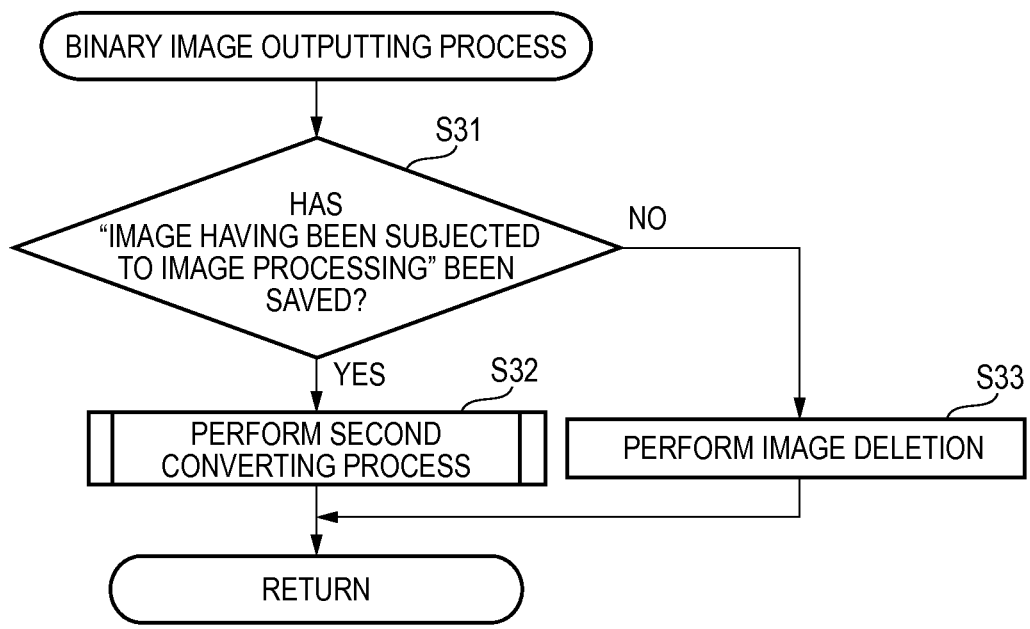
FIG. 11 is a flow chart illustrating the flow of a binary image outputting process.

In FIG. 11, there is shown the flow of the binary image outputting process which is performed in STEP S710 shown in FIG. 9.

In the binary image outputting process, in STEP S31, the CPU 51 determines whether the image having been subjected to the image processing has been saved in the RAM 53.

In a case where the image having been subjected to the image processing has been saved in the RAM 53 ("YES" in STEP S31), the CPU 51 performs a second converting process in STEP S32, and then finishes the binary image outputting process. The second converting process will be described below.

In a case where the image having been subjected to the image processing has not been saved in the RAM 53 ("NO" in STEP S31), since the CPU 51 cannot perform the second converting process, the CPU 51 deletes the BW binary image having been saved in the RAM 53, in STEP S33, and then finishes the binary image outputting process, without outputting any image.

Hereinafter, a first example of a second converting process will be described.

Figure 12:
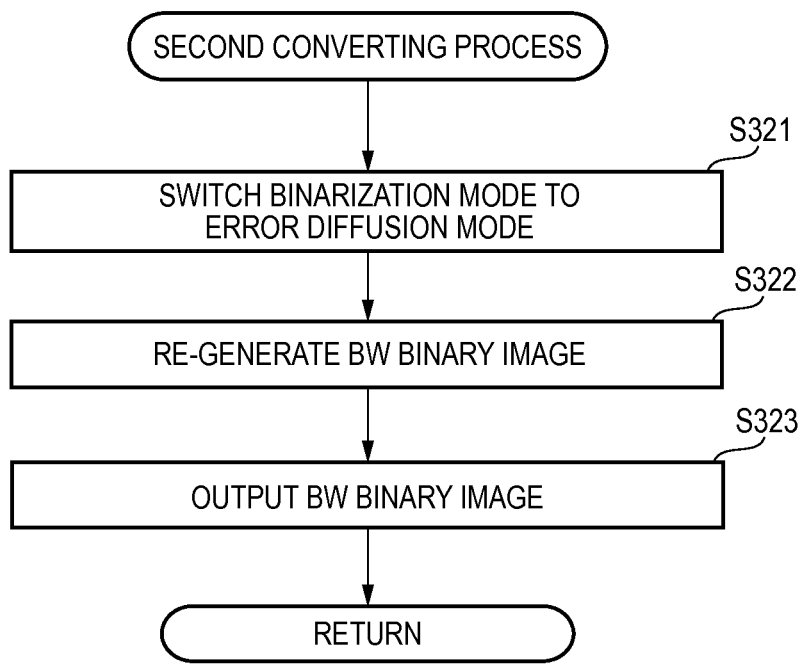
FIG. 12 is a flow chart illustrating the flow of a second converting process.

In FIG. 12, there is shown an example of the second converting process which is performed in STEP S32 shown in FIG. 11.

In the second converting process, in STEP S321, the CPU 51 switches the binarization mode of the binarization unit 517 from the simple binarization mode to the error diffusion mode.

Subsequently, in STEP S322, the CPU 51 performs control such that the binarization unit 517 binarizes the image having been subjected to the image processing and having been saved in the RAM 53, thereby re-generating a BW binary image.

Thereafter, the CPU 51 outputs the re-generated BW binary image to the predetermined output destination in STEP S323, and then finishes the second converting process.

Alternatively, the second converting process shown in FIG. 12 may be performed in advance before it is determined to perform the corresponding second converting process.

Hereinafter, a first example of a binary image determination process will be described.

Figure 13:
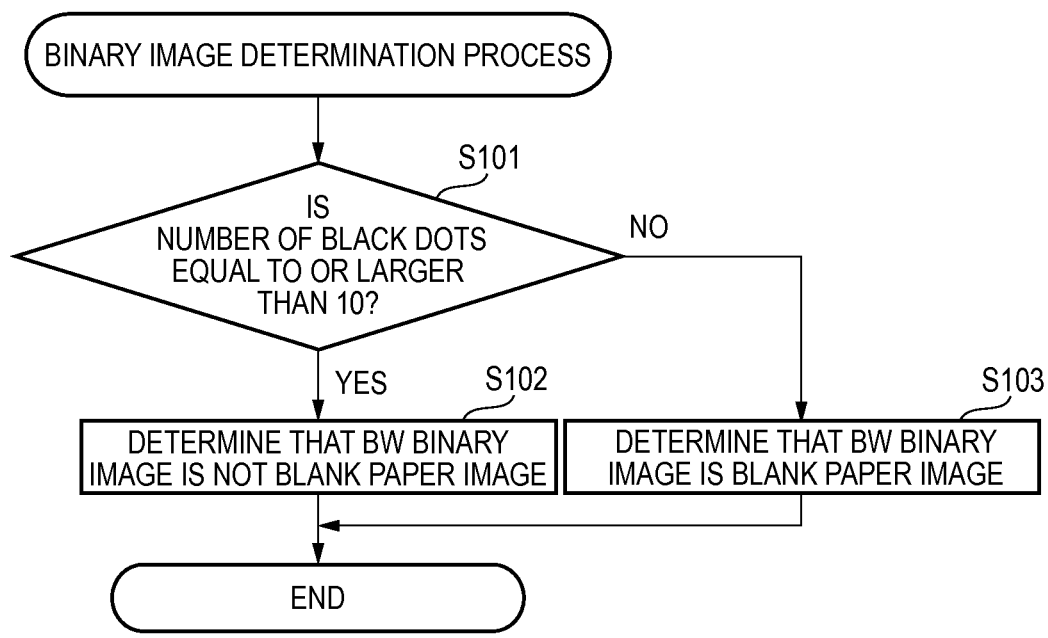
FIG. 13 is a flow chart illustrating the flow of a binary image determination process.

In FIG. 13, there is shown the flow of the binary image determination process of the binarization unit 517.

In the binary image determination process, in STEP S101, the CPU 51 determines whether the number of dots (number of pixels) which are black pixels in the BW binary image is equal to or greater than a predetermined threshold value, for example, 10.

In a case where the number of dots which are black pixels is 10 or greater ("YES" in STEP S101), in STEP S102, the CPU 51 determines that the BW binary image is not a blank paper image, and saves the result of the determination in the RAM 53. Then, the CPU 51 finishes the binary image determination process.

In a case where the number of dots which are black pixels is smaller than 10 ("NO" in STEP S101), in STEP S103, the CPU 51 determines that the BW binary image is a blank paper image, and saves the result of the determination in the RAM 53. Then, the CPU 51 finishes the binary image determination process.

As described above, the CPU 51 counts the number of dots which are black pixels in the BW binary image, and compares the number of dots having been counted, with the threshold value, thereby capable of easily determining whether the BW binary image is a blank paper image. Also, since the binary image determination method is simple, it is possible to expect an increase in the speed of the binary image determination process.

As described above, after a multi-value image is obtained by the image reading unit 20, and is subjected to image processing, the blank paper determining unit 514 performs the multi-value image determination on the image having been subjected to the image processing. Thereafter, it is determined which scan type has been set. In a case where the automatic scan type has been set, the color-type detecting unit 515 performs the color-type detection.

In a case where the blank paper removal function has been set to invalid, the BW scan type is set, and if the result of the determination of the color-type detecting unit 515 represents that the corresponding image is a BW image, the binarization unit 517 binarizes the corresponding image in the simple binarization mode, thereby generating a BW binary image, and outputs the BW binary image. Since the blank paper removal function has been set to be invalid, even if every pixel of the image having been subjected to the image processing is converted into a white pixel by the binarization in the simple binarization mode, and the blank paper image is output, there is no problem in the output result.

In a case where the blank paper removal function has been set to be valid, if the result of the multi-value image determination of the blank paper determining unit 514 represents that the corresponding image is a blank paper image, any image is not output. Therefore, the result in which any image is not output due to the blank paper removal function corresponds to the result of the multi-value image determination of the blank paper determining unit 514.

Also, in the case where the blank paper removal function has been set to be valid, if the result of the multi-value image determination of the blank paper determining unit 514 represents the image having been subjected to the image processing is not a blank paper image, and the BW scan type has been set, and the result of the binary image determination of the binarization unit 517 represents that the BW binary image is a blank paper image, the BW image having been generated by the binarization in the error diffusion mode is output. If the result of the binary image determination of the binarization unit 517 represents that the BW binary image is not a blank paper image, the BW image having been generated by the binarization in the simple binarization mode is output.

In the case where the blank paper removal function has been set to be valid, if the result of the multi-value image determination of the blank paper determining unit 514 represents the image having been subjected to the image processing is not a blank paper image, and the result of the determination of the color-type detecting unit 515 represents that the image having been subjected to the color converting process is a BW image, and the result of the binary image determination of the binarization unit 517 represents that the BW binary image is a blank paper image, the grayscale JPEG multi-value image is output. In a case where the result of the binary image determination of the binarization unit 517 represents that the BW binary image is not a blank paper image, the BW binary image having been generated by the binarization in the simple binarization mode is output.

In the binarization in the error diffusion mode, or the conversion into the grayscale JPEG multi-value image by the JPEG compression unit 516, it is possible to suppress each pixel of the image having been subjected to the image processing from being converted into a white pixel, as compared to the binarization in the simple binarization mode. As a result, it is possible to suppress a blank paper image from been output although the result of the multi-value image determination of the blank paper determining unit 514 represents the image having been subjected to the image processing is not a blank paper image. Therefore, it is possible to expect an output result corresponding to the result of the multi-value image determination of the blank paper determining unit 514.

Also, in a case where the amount of free space of the RAM 53 is equal to or larger than the defined amount, the control unit 50 performs control such that the RAM 53 saves the image having been subjected to the image processing. In a case where the amount of free space of the RAM 53 is smaller than the defined amount, the control unit 50 performs control such that the RAM 53 does not save the image having been subjected to the image processing.

In a case where there is a sufficient amount of free space in the RAM 53, the image having been subjected to the image processing is saved in the RAM 53. Therefore, in a case where it is necessary to output the BW binary image having been generated by the binarization in the error diffusion method, that is in a case where the result of the multi-value image determination of the blank paper determining unit 514 represents that the image having been subjected to the image processing is not a blank paper image and the result of the binary image determination of the binarization unit 517 represents that the BW binary image is a blank paper image, it is possible to use the image having been subjected to the image processing and having been saved in the RAM 53, in the binarization in the error diffusion mode.

On the other hand, in a case where the amount of free space of the RAM 53 is not sufficient, since the image having been subjected to the image processing is not saved in the RAM 53, it is possible to suppress the RAM 53 from becoming insufficient due to the image having been subjected to the image processing. In this case, even if the result of the multi-value image determination of the blank paper determining unit 514 represents that the image having been subjected to the image processing is not a blank paper image, the BW binary image having been generated by the binarization in the error diffusion mode cannot be output. Therefore, in a case where the result of the binary image determination of the binarization unit 517 represents that the BW binary image is a blank paper image, any image is not output.

Also, in the case where the automatic scan type has been set, the color-type detecting unit 515 performs the color-type detection. If the result of the determination on the color-type detection represents that the image having been subjected to the color converting process is a BW image, the grayscale JPEG multi-value image is generated before it is determined to output the grayscale JPEG multi-value image.

Since the grayscale JPEG multi-value image is generated in advance, it is possible to expect an increase in the speed of outputting of the grayscale JPEG multi-value image. That is, in a case where the result of the multi-value image determination represents that the image having been subjected to the image processing is not a blank paper image, and the result of the binary image determination represents that the binary BW image is not a blank paper image, it is possible to expect outputting corresponding to the determination to be performed at high speed.

Hereinafter, a second example of the second converting process will be described.

Figure 14:
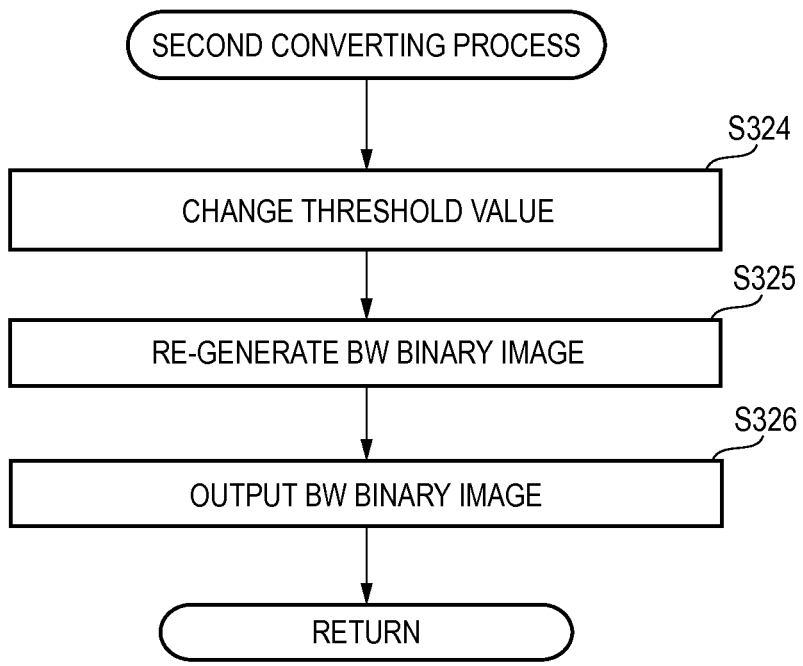
FIG. 14 is a flow chart illustrating another example of the second converting process.

The second converting process which is performed in STEP S32 shown in FIG. 11 may be a process shown in FIG. 14.

In the second converting process shown in FIG. 14, in STEP S324, the CPU 51 changes the threshold value for the binarization in the simple binarization mode by the function of the binarization unit 517, to the low density side. In this case, the CPU 51 generates the Y component histogram of the entire image, and changes the threshold value such that each pixel of at least a portion of the pixels is converted into a black pixel.

Subsequently, in STEP S325, the CPU 51 performs control such that the binarization unit 517 re-performs the binarization in the simple binarization mode, thereby re-generating a BW binary image.

Thereafter, the CPU 51 outputs the re-generated BW binary image to the predetermined output destination in STEP S326, and then finishes the second converting process.

Therefore, it becomes difficult for a blank paper image to be output.

Alternatively, the second converting process shown in FIG. 14 may be performed in advance before it is determined to perform the corresponding second converting process.

Hereinafter, a third example of the second converting process will be described.

Figure 15:
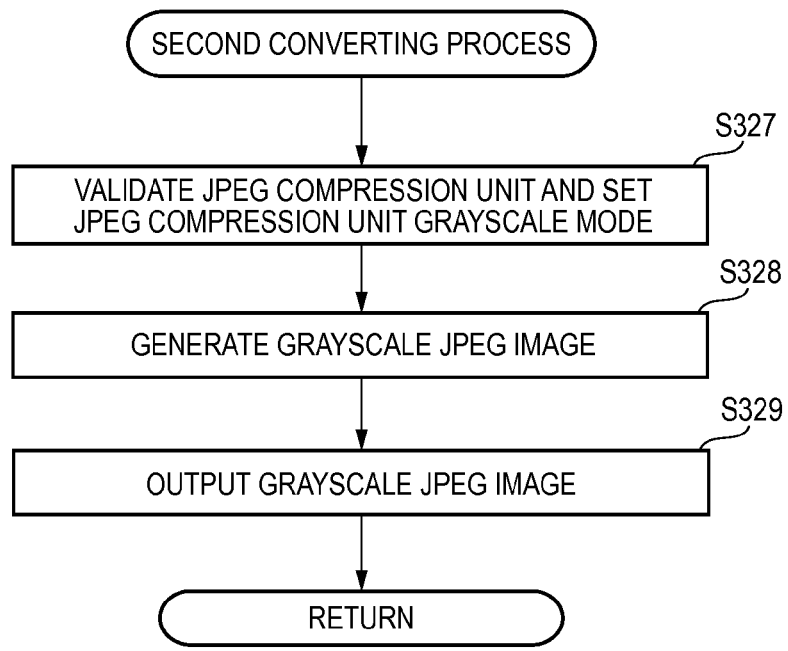
FIG. 15 is a flow chart illustrating a further example of the second converting process.

The second converting process which is performed in STEP S32 shown in FIG. 11 may be a process shown in FIG. 15.

In the second converting process shown in FIG. 15, in STEP S327, the CPU 51 validates the mode for generating only grayscale JPEG multi-value images (the grayscale mode), as the operation mode of the JPEG compression unit 516.

Subsequently, in STEP S328, the CPU 51 performs control such that the JPEG compression unit 516 generates a grayscale JPEG multi-value image.

Thereafter, the CPU 51 outputs the grayscale JPEG multi-value image to the predetermined output destination in STEP S329, and then finishes the second converting process.

Alternatively, the second converting process shown in FIG. 15 may be performed in advance before it is determined to perform the corresponding second converting process.

Hereinafter, a second example of the binary image determination process will be described.

Figure 16:
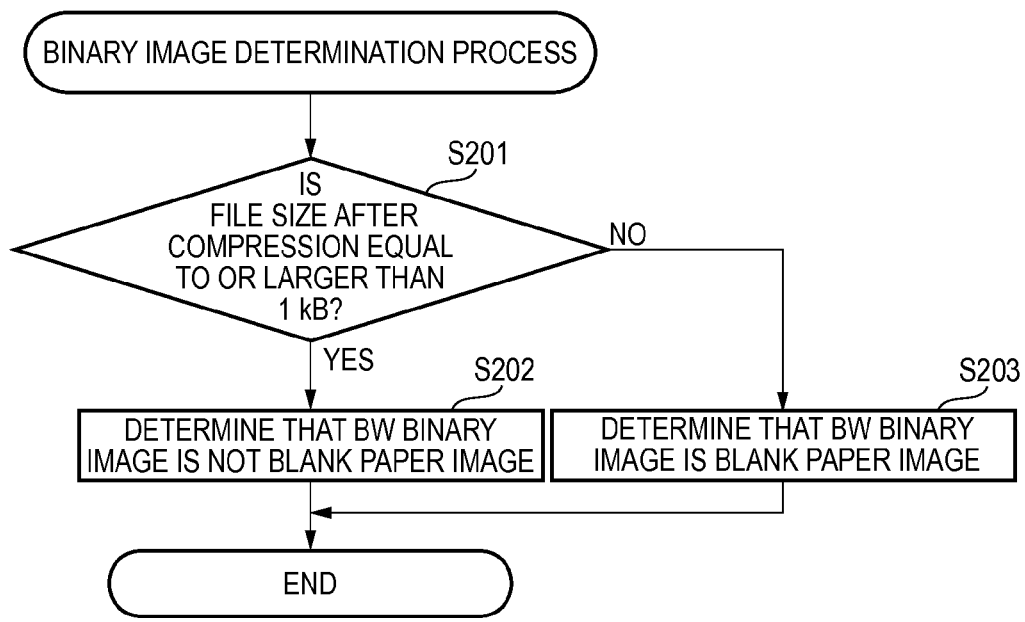
FIG. 16 is a flow chart illustrating another example of the binary image determination process.

In a case where the BW binary image having been generated by the function of the binarization unit 517 is compressed and output, the binary image determination process of the binarization unit 517 may be a process shown in FIG. 16.

As the number of white pixels in the BW binary image increases, the compression ratio of the BW binary image increases, and a file size of the compressed BW binary image decreases. For this reason, in STEP S201, the CPU 51 determines whether the file size of the BW binary image is equal to or larger than a predetermined threshold value, for example, 1 kB (kilobyte).

In a case where the file size of the BW binary image is equal to or larger than 1 kB ("YES" in STEP S201), in STEP S202, the CPU 51 determines that the BW binary image is not a blank paper image, and saves the result of the determination in the RAM 53.

In a case where the file size of the BW binary image is smaller than 1 kB ("NO" in STEP S201), in STEP S202, the CPU 51 determines that the BW binary image is a blank paper image, and saves the result of the determination in the RAM 53.

That is, the control unit 50 saves the BW binary image having been compressed in a compressing process, in the RAM 53. Then, in the binary image determination process, in a case where the size of the BW binary image having been compressed by the compressing process is equal to or larger than 1 kB, it is determined that the BW binary image is not a blank paper image.

As described above, the file size of the compressed BW binary image is compared with the threshold value, whereby it is possible to easily determine whether the BW binary image is a blank paper image. Also, since the binary image determination method is simple, it is possible to expect an increase in the speed of the binary image determination process.

Hereinafter, a second example of the image outputting process will be described.

Figure 17B:
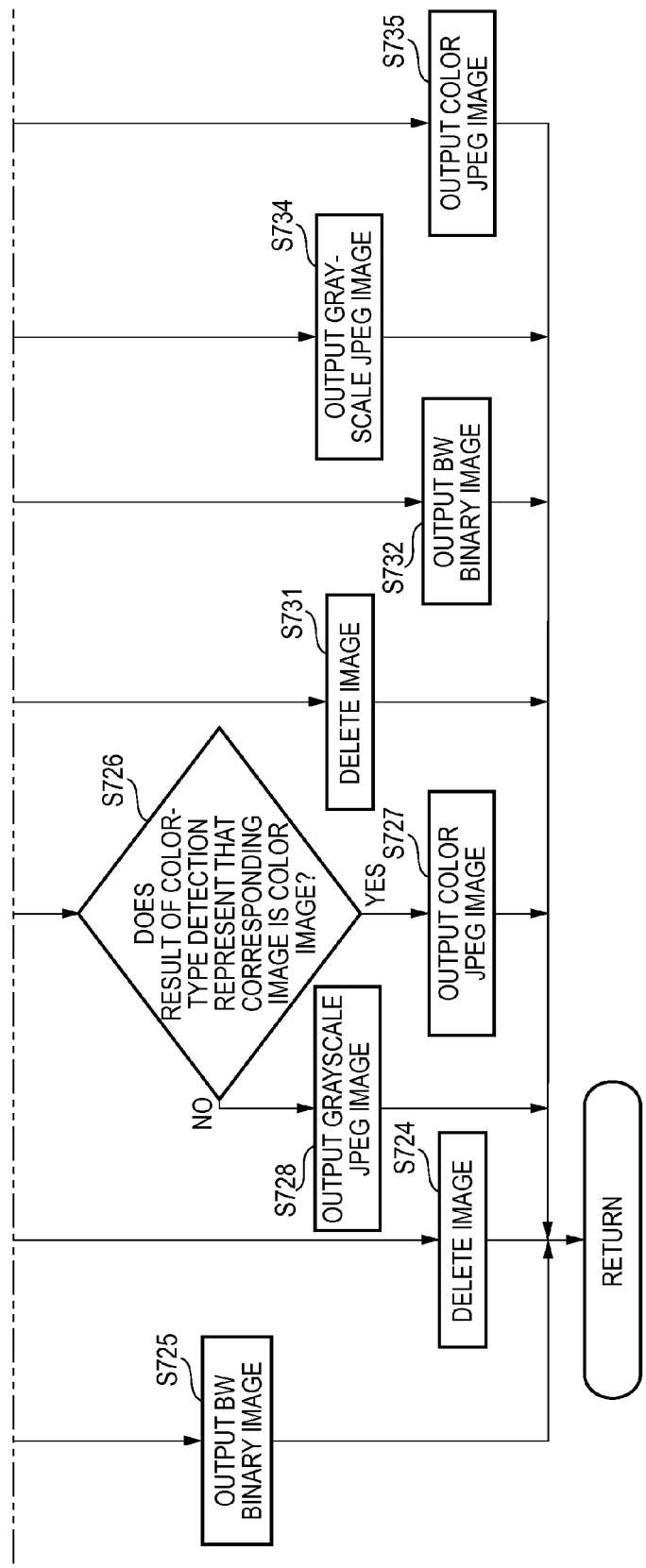

The image outputting process which is performed in STEP S7 shown in FIG. 3 may be a process shown in FIG. 17.

In the image outputting process shown in FIG. 17, in STEP S721, the CPU 51 determines whether the automatic scan type has been set.

In a case where the automatic scan type has been set, in the automatic setting process described above, as the operation mode of the JPEG compression unit 516, the mode for generating grayscale JPEG multi-value images or color JPEG multi-value images (the grayscale mode or the color mode) is validated, and the binarization unit 517 is validated.

In the case where automatic scan type has been set ("YES" in STEP S721), in STEP S722, the CPU 51 determines whether the result of the determination of the color-type detecting unit 515 represents that the corresponding image is a BW image.

In a case where the result of the determination of the color-type detecting unit 515 represents that the corresponding image is a BW image ("YES" in STEP S722), the CPU 51 performs control such that the binarization unit 517 generates a BW binary image, and performs binary image determination on the BW binary image. The generated BW binary image is saved in the RAM 53. Thereafter, in STEP S723, the CPU 51 determines whether the result of the binary image determination of the binarization unit 517 represents that the BW binary image is a blank paper image.

In a case where the result of the binary image determination of the binarization unit 517 represents that the BW binary image is a blank paper image ("YES" in STEP S723), in STEP S724, the CPU 51 deletes the BW binary image having been saved in the RAM 53. After the BW binary image is deleted, the CPU 51 finishes the image outputting process.

In a case where the result of the binary image determination represents that the BW binary image is not a blank paper image ("NO" in STEP S723), the CPU 51 outputs the BW binary image having been saved in the RAM 53, to the predetermined output destination, in STEP S725, and then finishes the image outputting process.

On the other hand, in a case where the result of the determination of the color-type detecting unit 515 represents that the corresponding image is not a BW image ("NO" in STEP S722), in STEP S726, the CPU 51 determines whether the result of the determination of the color-type detecting unit 515 represents that the corresponding image is a color image.

In a case where the result of the determination of the color-type detecting unit 515 represents that the corresponding image is a color image ("YES" in STEP S726), in STEP S727, the CPU 51 performs control such that the JPEG compression unit 516 generates a color JPEG multi-value image, and outputs the color JPEG multi-value image to the predetermined output destination. Then, the CPU 51 finishes the image outputting process.

On the other hand, in a case where the result of the determination of the color-type detecting unit 515 represents that the corresponding image is not a BW image or a color image ("NO" in STEP S726), in STEP S728, the CPU 51 performs control such that the JPEG compression unit 516 generates a grayscale JPEG multi-value image, and outputs the grayscale JPEG multi-value image to the predetermined output destination. Then, the CPU 51 finishes the image outputting process.

In a case where the automatic scan type has not been set ("NO" in STEP S721), in STEP S729, the CPU 51 determines whether the BW scan type has been set.

In a case where the BW scan type has been set, in the monochrome setting process described above, the binarization unit 517 is validated.

In the case where the BW scan type has been set ("YES" in STEP S729), the CPU 51 performs control such that the binarization unit 517 generates a BW binary image, and performs binary image determination on the BW binary image. The generated BW binary image is saved in the RAM 53. Thereafter, in STEP S730, the CPU 51 determines whether the result of the binary image determination of the binarization unit 517 represents that the BW binary image is a blank paper image.

In a case where the result of the binary image determination represents that the BW binary image is a blank paper image ("YES" in STEP S730), in STEP S731, the CPU 51 deletes the BW binary image having been saved in the RAM 53. After the BW binary image is deleted, the CPU 51 finishes the image outputting process.

In a case where the result of the binary image determination represents that the BW binary image is not a blank paper image ("NO" in STEP S730), the CPU 51 outputs the BW binary image having been saved in the RAM 53, to the predetermined output destination, in STEP S732, and then finishes the image outputting process.

In a case where the BW scan type has not been set ("NO" in STEP S729), in STEP S733, the CPU 51 determines whether the grayscale scan type has been set.

In a case where the grayscale scan type has been set, in the monochrome setting process described above, as the operation mode of the JPEG compression unit 516, the mode for generating only grayscale JPEG multi-value images (the grayscale mode) is validated.

In the case where the grayscale scan type has been set ("YES" in STEP S733), the CPU 51 outputs the grayscale JPEG multi-value image having been generated by the function of the JPEG compression unit 516, to the predetermined output destination, in STEP S734, and then finishes the image outputting process.

In a case where any of the automatic scan type, the BW scan type, and the grayscale scan type has not been set, that is, in a case where the color scan type has been set ("NO" in STEP S733), in the color setting process described above, as the operation mode of the JPEG compression unit 516, the mode for generating only color JPEG multi-value images (the color mode) is validated. In this case, the CPU 51 outputs the color JPEG multi-value image having been generated by the function of the JPEG compression unit 516, to the predetermined output destination, in STEP S735, and then finishes the image outputting process.

As described above, in the case where the result of the multi-value image determination of the blank paper determining unit 514 represents the image having been subjected to the image processing is not a blank paper image, and the result of the determination of the color-type detecting unit 515 represents that the image having been subjected to the color converting process is a BW image, and the result of the binary image determination of the binarization unit 517 represents that the BW binary image is a blank paper image, the BW binary image having been saved in the RAM 53 is deleted. Therefore, any image is not output. Also, in the case where the result of the multi-value image determination of the blank paper determining unit 514 represents the image having been subjected to the image processing is not a blank paper image, and the BW scan type has been set, and the result of the binary image determination of the binarization unit 517 represents that the BW binary image is a blank paper image, the BW binary image having been saved in the RAM 53 is deleted. Therefore, any image is not output. Therefore, the result in which any image is not output corresponds to the result of the binary image determination of the binarization unit 517.

Therefore, it is possible to expect an output result corresponding to the result of the binary image determination of the binary image determination process. That is, it is determined whether the BW binary image, which has been saved, as an output image to be output to the predetermined output destination, in the RAM 53, is a blank paper image (the binary image determination), and if it is determined that the BW binary image is a blank paper image, the corresponding BW binary image is deleted. Therefore, in a case where the blank paper removal function has been set to be valid, it is possible to suppress a BW binary image which is a blank paper image from being output.

Hereinafter, a second example of the reading process will be described.

Figure 18:
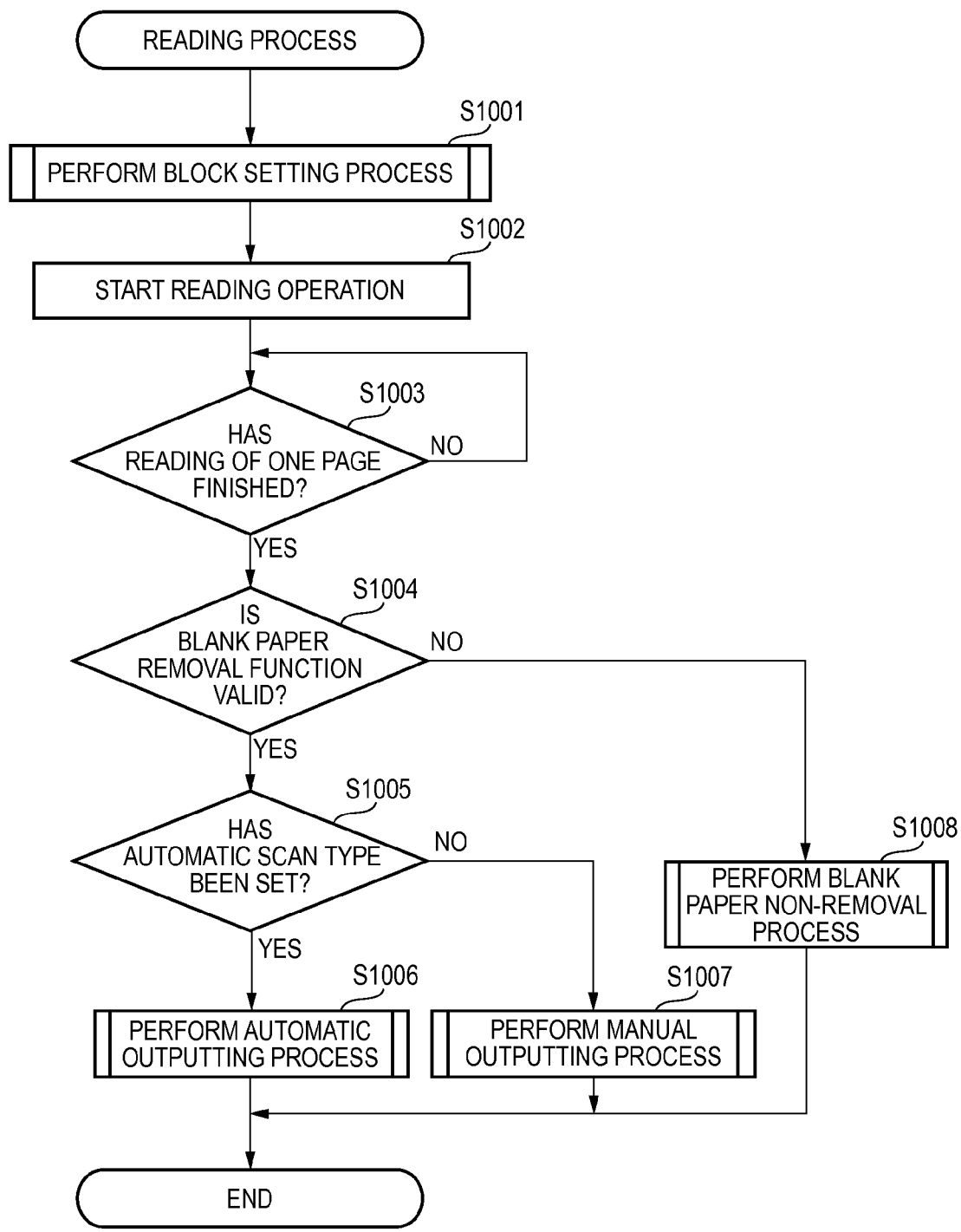
FIG. 18 is a flow chart illustrating another example of the reading process.

The reading process shown in FIG. 3 may be a process shown in FIG. 18. Incidentally, processes of STEPS S1001 to S1004 and S1008 are the same as processes of STEPS S1 to S4 and S8 in FIG. 3.

In a case where the blank paper removal function has been set to be valid ("YES" in STEP S1004), the CPU 51 determines whether the automatic scan type has been set in STEP S1005. When the automatic scan type has been set, if the process of the image processing unit 513 finishes, the color-type detection of the color-type detecting unit 515 is performed. Thereafter, according to the result of the color-type detection, a color JPEG multi-value image is generated by the JPEG compression unit 516, or a grayscale JPEG multi-value image is generated by the JPEG compression unit 516, or a BW binary image is generated by the binarization unit 517 and is saved in the RAM 53. When the color scan type has been set, after the process of the image processing unit 513, a color JPEG multi-value image is generated by the JPEG compression unit 516 and is saved in RAM 53. When the grayscale scan type has been set, after the process of the image processing unit 513, a grayscale JPEG multi-value image is generated by the JPEG compression unit 516 and is saved in RAM 53. When the BW scan type has been set, after the process of the image processing unit 513, a BW binary image is generated by the binarization unit 517 and is saved in the RAM 53.

Figure 19:
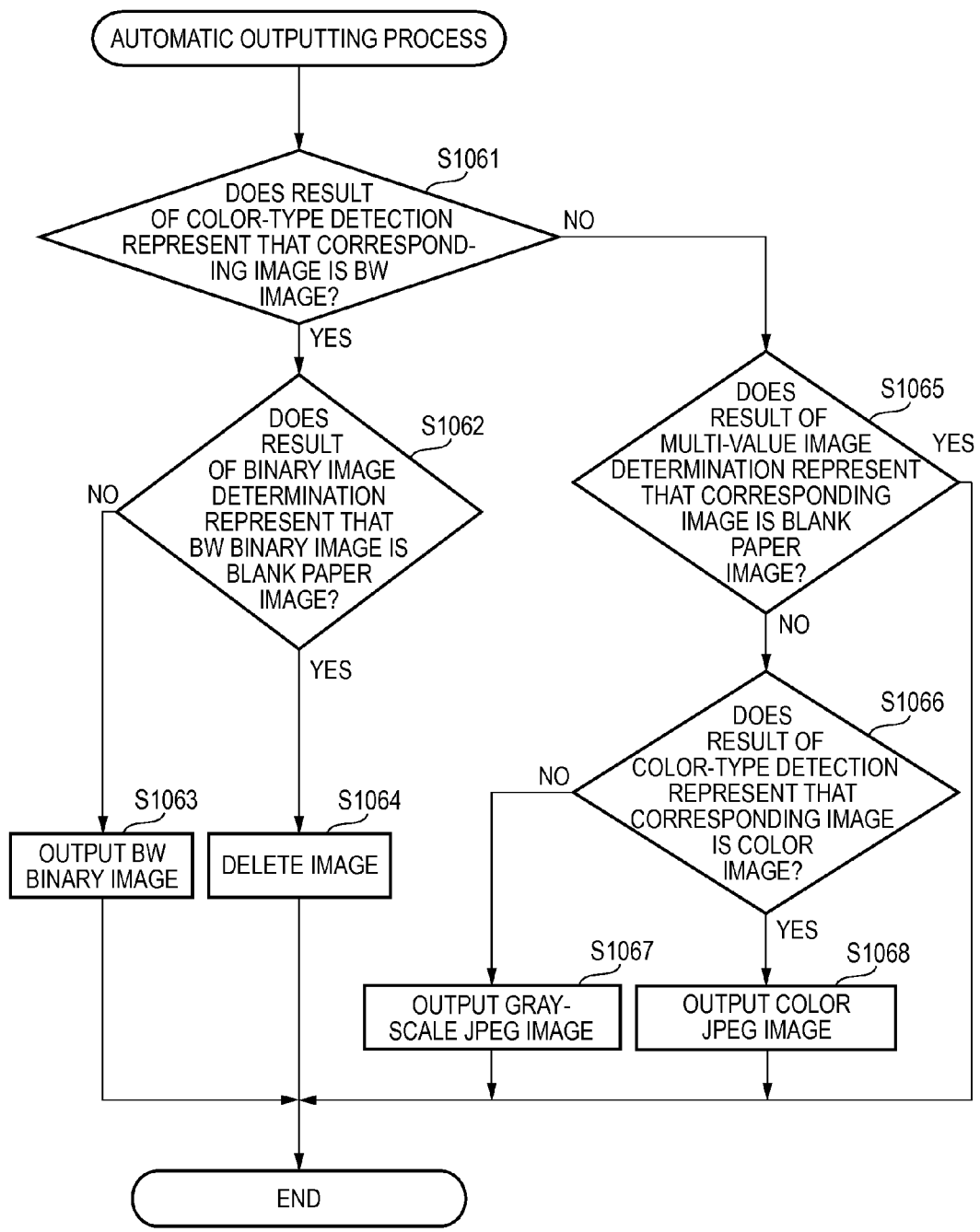
FIG. 19 is a flow chart illustrating the flow of an automatic outputting process.

In FIG. 19, there is shown the flow of the automatic outputting process which is performed in STEP S1006 in a case where the automatic scan type has been set ("YES" in STEP S1005) in FIG. 18.

In the automatic outputting process, in STEP S1061, the CPU 51 determines whether the result of the determination of the color-type detecting unit 515 represents that the corresponding image is a BW image.

In a case where the result of the determination of the color-type detecting unit 515 represents that the corresponding image is a BW image ("YES" in STEP S1061), subsequently to the determination of the color-type detecting unit 515, the CPU 51 performs control such that the binarization unit 517 generates a BW binary image, and performs binary image determination on the BW binary image. Also, the generated BW binary image is saved in the RAM 53. Thereafter, in STEP S1062, the CPU 51 determines whether the result of the binary image determination of the binarization unit 517 represents that the BW binary image is a blank paper image.

In a case where the result of the binary image determination of the binarization unit 517 represents that the BW binary image is a blank paper image ("YES" in STEP S1062), in STEP S1064, the CPU 51 deletes the BW binary image having been saved in the RAM 53, from the RAM 53. Therefore, any image is not output. Then, the CPU 51 finishes the automatic outputting process.

On the other hand, in a case where the result of the binary image determination of the binarization unit 517 represents that the BW binary image is not a blank paper image ("NO" in STEP S1062), in STEP S1063, the CPU 51 outputs the BW binary image having been saved in the RAM 53, to the predetermined output destination. Then, the CPU 51 finishes the automatic outputting process.

In a case where the result of the determination of the color-type detecting unit 515 represents that the corresponding image is not a BW image ("NO" in STEP S1061), subsequently to the determination of the color-type detecting unit 515, the CPU 51 performs control such that the blank paper determining unit 514 performs the multi-value image determination. Thereafter, in STEP S1065, the CPU 51 determines whether the result of the multi-value image determination of the blank paper determining unit 514 represents that the corresponding image is a blank paper image.

In a case where the result of the multi-value image determination of the blank paper determining unit 514 represents that the corresponding image is a blank paper image ("YES" in STEP S1065), the CPU 51 finishes the automatic outputting process.

In a case where the result of the multi-value image determination of the blank paper determining unit 514 represents that the corresponding image is not a blank paper image ("NO" in STEP S1065), in STEP S1066, the CPU 51 determines whether the result of the determination of the color-type detecting unit 515 represents that the corresponding image is a color image.

In a case where the result of the determination of the color-type detecting unit 515 represents that the corresponding image is a color image ("YES" in STEP S1066), in STEP S68, the CPU 51 performs control such that the JPEG compression unit 516 generates a color JPEG multi-value image, and outputs the color JPEG multi-value image to the predetermined output destination. Then, the CPU 51 finishes the automatic outputting process.

On the other hand, in a case where the result of the determination of the color-type detecting unit 515 represents that the corresponding image is not a color image ("NO" in STEP S1066), in STEP S1067, the CPU 51 performs control such that the JPEG compression unit 516 generates a grayscale JPEG multi-value image, and outputs the grayscale JPEG multi-value image to the predetermined output destination. Then, the CPU 51 finishes the automatic outputting process.

Figure 20:
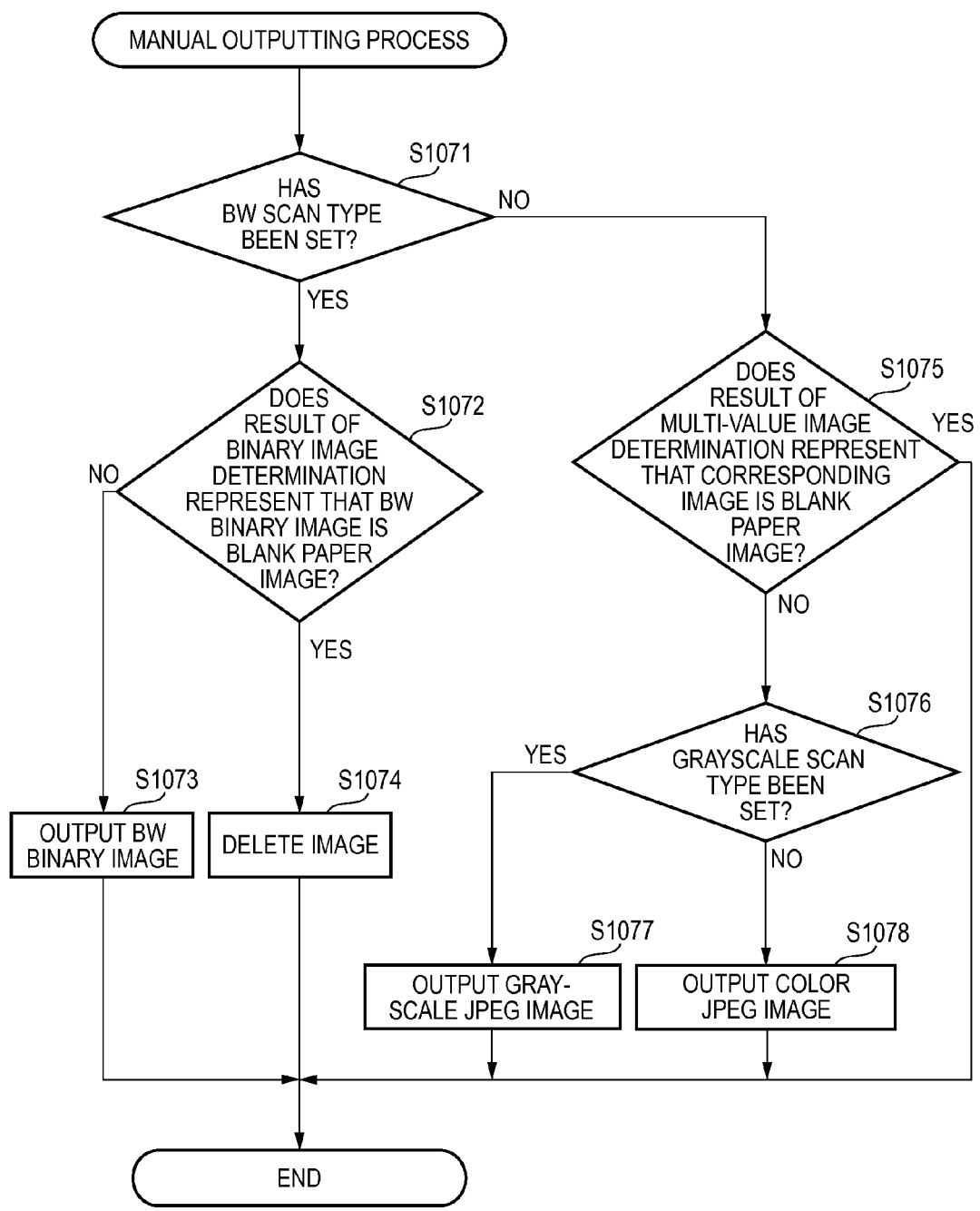
FIG. 20 is a flow chart illustrating the flow of a manual outputting process.

In FIG. 20, there is shown the flow of the manual outputting process which is performed in STEP S1007 in a case where the automatic scan type has not been set ("NO" in STEP S1005) in FIG. 18.

In the manual outputting process, in STEP S1071, the CPU 51 determines whether the BW scan type has been set.

In a case where the BW scan type has been set ("YES" in STEP S1071), the CPU 51 performs control such that the binarization unit 517 generates a BW binary image, and performs binary image determination on the BW binary image. Also, the generated BW binary image is saved in the RAM 53. Thereafter, in STEP S1072, the CPU 51 determines whether the result of the binary image determination of the binarization unit 517 represents that the BW binary image is a blank paper image.

In a case where the result of the binary image determination of the binarization unit 517 represents that the BW binary image is a blank paper image ("YES" in STEP S1072), in STEP S74, the CPU 51 deletes the BW binary image having been saved in the RAM 53, from the RAM 53. Then, the CPU 51 finishes the manual outputting process.

On the other hand, in a case where the result of the binary image determination of the binarization unit 517 represents that the BW binary image is not a blank paper image ("NO" in STEP S1072), in STEP S1073, the CPU 51 outputs the BW binary image having been saved in the RAM 53, to the predetermined output destination. Then, the CPU 51 finishes the manual outputting process.

In a case where the BW scan type has not been set ("NO" in STEP S1071), the CPU 51 performs control such that the blank paper determining unit 514 performs the multi-value image determination. Thereafter, in STEP S1075, the CPU 51 determines whether the result of the multi-value image determination of the blank paper determining unit 514 represents that the corresponding image is a blank paper image.

In a case where the result of the multi-value image determination of the blank paper determining unit 514 represents that the corresponding image is a blank paper image ("YES" in STEP S1075), the CPU 51 finishes the manual outputting process.

In a case where the result of the multi-value image determination of the blank paper determining unit 514 represents that the corresponding image is not a blank paper image ("NO" in STEP S1075), in STEP S1076, the CPU 51 determines whether the grayscale scan type has been set.

In the case where the grayscale scan type has been set ("YES" in STEP S1076), in STEP S1077, the CPU 51 performs control such that the JPEG compression unit 516 generates a grayscale JPEG multi-value image, and outputs the grayscale JPEG multi-value image to the predetermined output destination. Then, the CPU 51 finishes the manual outputting process.

In the case where the grayscale scan type has not been set ("NO" in STEP S1076), in STEP S1078, the CPU 51 performs control such that the JPEG compression unit 516 generates a color JPEG multi-value image, and outputs the color JPEG multi-value image to the predetermined output destination. Then, the CPU 51 finishes the manual outputting process.

As described above, after a multi-value image is obtained by the image reading unit 20, and is subjected to image processing, if it is determined that the automatic scan type or the BW scan type has been set, the binarization unit 517 performs binarization and the binary image determination. In the binarization of the binarization unit 517, the image having been subjected to the image processing is converted into a BW binary image by binarization in the simple binarization mode. In the binary image determination of the binarization unit 517, on the basis of the BW binary image, it is determined whether the corresponding BW binary image is a blank paper image.

On the other hand, in a case where any one of the automatic scan type, the color scan type, and the grayscale scan type has been set, the process of the JPEG compression unit 516 and the multi-value image determination of the blank paper determining unit 514 are performed. In the process of the JPEG compression unit 516, the image having been subjected to the image processing is converted into a color JPEG multi-value image or a grayscale JPEG multi-value image. In the multi-value image determination of the blank paper determining unit 514, on the basis of the image having been subjected to the image processing, it is determined whether the image having been subjected to the image processing is a blank paper image.

Therefore, in the case where the BW binary image is output, the multi-value image determination of the blank paper determining unit 514 is not performed, and the binary image determination of the binarization unit 517 is performed. On the other hand, in the case where the color JPEG multi-value image or the grayscale JPEG multi-value image is output, the binary image determination of the binarization unit 517 is not performed, and the multi-value image determination of the blank paper determining unit 514 is performed.

In a case where it is determined that the BW binary image is a blank paper image, the corresponding BW binary image is not output. Therefore, the result in which any image is not output due to the blank paper removal function corresponds to the result of the binary image determination of the binarization unit 517. On the other hand, in a case where it is determined that the BW binary image is not a blank paper image, the corresponding BW binary image is output. Therefore, the result in which the BW binary image is output corresponds to the blank paper determination result of the binary image determination process.

In a case where it is determined in the multi-value image determination that the image having been subjected to the image processing is a blank paper image, any image is not output. Therefore, the result in which any image is not output due to blank paper removal corresponds to the result of the multi-value image determination. On the other hand, in a case where it is determined in the multi-value image determination that the image having been subjected to the image processing is not a blank paper image, the color JPEG multi-value image or the grayscale JPEG multi-value image is output. Therefore, the result in which a multi-value image is output corresponds to the result of the multi-value image determination of the blank paper determining unit in the multi-value image determination process.

Therefore, it is possible to expect an output result corresponding to the blank paper determination result.

Also, in a case where the automatic scan type has been set, generation of a color JPEG multi-value image or generation of a grayscale JPEG multi-value image is performed after the result of the multi-value image determination of the blank paper determining unit 514 and the result of the determination of the color-type detecting unit 515 are obtained. Therefore, it is possible to reduce a possibility that a color JPEG multi-value image and a grayscale JPEG multi-value image might be unnecessarily generated and be saved in the RAM 53, resulting in an insufficient storage area of the RAM 53.

<Modifications to Illustrative Embodiments>

Although the illustrative embodiment of the present invention has been described above, the present invention can also be implemented in any other forms.

In the above-described illustrative embodiment, in a case where the result of the multi-value image determination of the blank paper determining unit 514 represents that the image having been subjected to the image processing is not a blank paper image, and the automatic scan type has been set, and the result of the binary image determination of the binarization unit 517 represents that the BW binary image is a blank paper image, the grayscale JPEG multi-value image is output. However, even in a case where the result of the multi-value image determination represents that the corresponding image is not a blank paper image, if the result of the binary image determination represents that the BW binary image is a blank paper image, the binary image outputting process shown in FIG. 11 may be performed, and the BW binary image having been generated in the second converting process (the process shown in FIG. 12 or 14) of the binary image outputting process may be output, instead of the grayscale JPEG multi-value image.

In this case, according to whether there is a sufficient amount of free space in the RAM 53, it is determined whether to save the image having been subjected to the image processing in order to use the corresponding image in the second converting process.

Also, in the above-described illustrative embodiment, a case where the CPU 51 performs the individual processes has been described. However, the ASIC 55 may perform the individual processes, or the CPU 51 and the ASIC 55 may perform the individual processes in cooperation with each other. Alternatively, the control unit 50 may have a plurality of CPUs, and the plurality of CPUs may perform the individual processes in cooperation with one another.

Also, programs for the individual processes which can be executed by the CPU 51 of the MFP 1 may be installed in a PC (computer) connected to the Internet, and in the PC, the same processes as the individual processes which are performed by the CPU 51 may be performed.

Further, programs for the individual processes which can be executed by the CPU 51 of the MFP 1 may be installed in a PC (not shown) connected to the MFP 1 through a local area network (LAN), instead of a PC (computer) connected to the Internet, and in the corresponding PC, the same processes as the individual processes which are performed by the CPU 51 may be performed.

Also, in the above-described illustrative embodiment, as the image processing apparatus, the MFP 1 having the printing function using the image forming unit 10 and the reading function using the image reading unit 20 has been exemplified. However, the image processing apparatus may be any other apparatus having a single function, such as a reading apparatus having a reading function.

Further, the above described configuration can be modified in various forms within the scope of claims.

What is claimed is:

1. An image processing apparatus comprising:
    an obtaining unit configured to obtain a multi-value image as an obtained image; and
    a control unit and a memory storing instructions which, when executed by the control unit, cause the control unit to:
        perform a binarizing process to convert the obtained image into a first binary image;
        perform a binary image determination process to determine whether the first binary image is a blank paper image, on the basis of the first binary image; and
        perform a first outputting process to output a binary image, the first outputting process comprising:
            outputting the first binary image in a case where it is determined in the binary image determination process that the first binary image is not the blank paper image and
            not outputting the first binary image in a case where it is determined in the binary image determination process that the first binary image is the blank paper image;
        perform a multi-value image determination process to determine whether the obtained image is the blank paper image, on the basis of the corresponding obtained image;
        perform a second outputting process to output a multi-value image; and
        perform a multi-value conversion process to convert the obtained image into the multi-value image to be output in the second outputting process,
    wherein in a case where it is determined in the multi-value image determination process that the obtained image is the blank paper image, the instructions, when executed, cause the control device not to output any image, and
    wherein in a case where it is determined in the multi-value image determination process that the obtained image is not the blank paper image, the instructions, when executed, cause the control device to output the multi-value image.

2. The image processing apparatus according to claim 1, wherein the instructions, when executed, cause the control unit to:
    perform the multi-value image determination process to determine whether the obtained image is the blank paper image, on the basis of the corresponding obtained image; and
    perform a condition determination process to determine whether a condition for determining that the obtained image is a binary image is satisfied or not, and
    wherein in the binary image determination process, in a case where it is determined in the multi-value image determination process that the obtained image is not the blank paper image and it is determined that the condition for determining that the obtained image is a binary image is satisfied, the instructions, when executed, cause the control device to determine whether the first binary image is the blank paper image.

3. The image processing apparatus according to claim 1, wherein the instructions, when executed, cause the control unit to:
    in a case where it is determined in the binary image determination process that the first binary image is the blank paper image, delete the first binary image and not to output any image in the first outputting process; and
    in a case where it is determined in the binary image determination process that the first binary image is not the blank paper image, output the first binary image in the first outputting process.

4. The image processing apparatus according to claim 3, wherein the binarizing process is a first converting process to convert the obtained image into a first converted image, the first converted image being the first binary image converted by binarization using a threshold value, wherein the instructions, when executed, cause the control unit to perform a second converting process to convert the obtained image into a second converted image, the second coverted image being a second binary image converted by binarization using an error diffusion method or by binarization using a threshold value that is different from that of the first converting process, or a multi-value image converted from the obtained image, and wherein in a case where it is determined in the binary image determination process that the first binary image is the blank paper image, the instructions, when executed, cause the control unit to output the second converted image in the first outputting process.

5. The image processing apparatus according to claim 4, further comprising:

a storage unit uncluded in the memory, wherein in a case where the amount of free space of the storage unit is equal to or larger than a defined amount, the instructions, when executed, cause the control unit to perform control such that the storage unit stores the obtained image, and in a case where it is determined in the multi-value image determination process that the obtained image is not the blank paper image and it is determined in the binary image determination process that the first binary image is the blank paper image, the instructions, when executed, cause the control unit to convert the obtained image having been stored in the storage unit into the second converted image in the second converting process, and to output the second converted image in the first outputting process, and wherein in a case where the amount of free space of the storage unit is smaller than the defined amount, the instructions, when executed, cause the control unit to perform control such that the storage unit does not store the obtained image, and in a case where it is determined in the multi-value image determination process that the obtained image is not the blank paper image and it is determined in the binary image determination process that the first binary image is the blank paper image, the instructions, when executed, cause the control unit not to output the first converted image in the first outputting process.

6. The image processing apparatus according to claim 4, wherein the instructions, when executed, cause the control unit to perform the second converting process to convert the obtained image into the second binary image by use of a threshold value having been set on a lower density side as compared to the threshold value used in the first converting process.

7. The image processing apparatus according to claim 6, wherein the instructions, when executed, cause the control unit to set the threshold value used in the second converting process, on the basis of data on luminance components of the obtained image, the threshold value being determined in a manner that a luminance value of at least one pixel of the obtained image is greater than the threshold value.

8. The image processing apparatus according to claim 4, wherein the instructions, when executed, cause the control unit to perform the second converting process before it is determined to output the second converted image.

9. The image processing apparatus according to claim 1, wherein in the multi-value image determination process, the instructions, when executed, cause the control unit to determine whether the obtained image is the blank paper image on the basis of data on luminance components of the obtained image.

10. The image processing apparatus according to claim 2, wherein the instructions, when executed, cause the control unit to:

perform a color determination process to determine whether the obtained image is a chromatic color image or an achromatic color image on the basis of a color difference data of the obtained image; and in a case where it is determined that the obtained image is an achromatic color image and it is determined that the obtained image includes a predetermined amount or more of pixels having luminance components smaller than a first threshold value or equal to or larger than a second threshold value, determine that the obtained image is the binary image.

11. The image processing apparatus according to claim 2, wherein the instructions, when executed, cause the control unit to:

perform an output designating process to receive a designation as to whether to output the binary image or the multi-value image; and in a case where it is received a designation to output the binary image, determine that the obtained image is the binary image.

12. The image processing apparatus according to claim 1, wherein the instructions, when executed, cause the control unit to determine in the binary image determination process that the first binary image is not the blank paper image in a case where the number of pixels having been converted into black pixels in the binarizing process is equal to or larger than a predetermined threshold value.

13. The image processing apparatus according to claim 1, wherein the instructions, when executed, cause the control unit to perform a compressing process to compress the first binary image, and wherein in the binary image determination process, in a case where a data size of the compressed first binary image is equal to or larger than a predetermined threshold value, the instructions, when executed, cause the control device to determine that the first binary image is not the blank paper image.

14. The image processing apparatus according to claim 1, wherein in the first outputting process, in a case where it is determined in the binary image determination process that the first binary image is the blank paper image, the instructions, when executed, cause the control device not to output the first binary image.

15. An image processing apparatus comprising:

an obtaining unit configured to obtain a multi-value image as an obtained image; and a control unit and a memory storing instructions which, when executed by the control unit, cause the control unit to:

perform a first converting process to convert the obtained image into a first converted image, the first converted image being a first binary image converted by binarization using a first threshold value;

perform a second converting process to convert the obtained image into a second converted image, the second converted image being a second binary image converted by binarization using an error diffusion method or by binarization using a second threshold value that is different from the first threshold value, or a multi-value image converted from the obtained image;

perform a multi-value image determination process to determine whether the obtained image is a blank paper image, on the basis of the corresponding obtained image;

perform a receiving process to receive setting as to whether to validate a blank paper removal function for removing a blank paper image: and perform a determining process to determine whether the obtained image is a binary image, wherein in a case where the received setting indicates invalidating the blank paper removal function, the instructions, when executed, cause the control unit to perform a first outputting process comprising:

in a case where it is determined that the obtained image is a binary image, outputting the first converted image, and wherein in a case where the received setting indicates validating the blank paper removal function, the instructions, when executed, cause the control unit to perform a second outputting process comprising:

in a case where it is determined in the multi-value image determination process that the obtained image is a blank paper image, not outputting any image; and in a case where it is determined in the multi-value image determination process that the obtained image is not the blank paper image and it is determined that the obtained image is a binary image, outputting the second converted image.

16. The image processing apparatus according to claim 15, wherein the instructions, when executed, cause the control unit to perform a binary image determination process to determine whether the first converted image is the blank paper image, on the basis of the first converted image, and wherein in a case where it has been determined in the multi-value image determination process that the obtained image is not the blank paper image, in the second outputting process, the instructions, when executed, cause the control unit to:

in a case where it is determined in the binary image determination process that the first converted image is not the blank paper image, output the first converted image in the second outputting process,; and in a case where it is determined in the binary image determination process that the first converted image is the blank paper image, output the second converted image in the second outputting process.

17. A non-transitory computer-readable medium having a computer program stored thereon and readable by a computer of an image processing apparatus having an obtaining unit configured to obtain a multi-value image as an obtained image, the computer program, when executed by the computer, causes the image processing apparatus to perform operations comprising:

converting the obtained image into a first binary image;

determining whether the first binary image is a blank paper image, on the basis of the first binary image; and outputting the first binary image in a case where it is determined in the binary image determination that the first binary image is not the blank paper image; and not outputting the first binary image in a case where it is determined in the binary image determination process that the first binary image is the blank paper image;

converting the obtained image into a multi-value image, wherein in a case where it is determined that the obtained image is the blank paper image, the instructions, when executed, cause the control device not to output any image, and wherein in a case where it is determined that the obtained image is not the blank paper image, the instructions, when executed, cause the control device to output the multi-value image.

18. The non-transitory computer-readable medium according to claim 17, wherein the computer program, when executed by the computer, causes the computer to perform operations comprising:

determining whether the obtained image is the blank paper image, on the basis of the corresponding obtained image; and determining whether the obtained image is a binary image, and wherein in a case where it is determined that the obtained image is not the blank paper image and it is determined that the obtained image is a binary image, the computer program, when executed by the computer, causes the image processing apparatus to perform operations comprising determining whether the first binary image is the blank paper image.

* * * * *